US012641419B2

(12) United States Patent
Mavureddi Dhanasekaran et al.

(10) Patent No.: US 12,641,419 B2
(45) Date of Patent: May 26, 2026

(54) METHOD, APPARATUS AND COMPUTER PROGRAM

(71) Applicant: Nokia Technologies Oy, Espoo (FI)

(72) Inventors: Ranganathan Mavureddi Dhanasekaran, Munich (DE); Saurabh Khare, Bangalore (IN); Suresh P Nair, Estero, FL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 329 days.

(21) Appl. No.: 18/447,355

(22) Filed: Aug. 10, 2023

(65) Prior Publication Data

US 2024/0056804 A1      Feb. 15, 2024

(30) Foreign Application Priority Data

Aug. 12, 2022      (IN) .............................. 202241046182

(51) Int. Cl.
*H04W 12/043* (2021.01)
*H04L 9/40* (2022.01)

(52) U.S. Cl.
CPC ......... *H04W 12/043* (2021.01); *H04L 63/062* (2013.01)

(58) Field of Classification Search
CPC ... H04L 63/06; H04L 63/12; H04L 2463/061; H04L 2209/80; H04W 12/062; H04W 12/043; H04W 36/0038
See application file for complete search history.

(56) References Cited

U.S. PATENT DOCUMENTS

| | | | | |
|---|---|---|---|---|
| 6,587,680 B1 * | 7/2003 | Ala-Laurila | ...... | H04W 12/0433 |
| | | | | 455/437 |
| 7,483,411 B2 * | 1/2009 | Weinstein | ........... | H04L 63/0892 |
| | | | | 370/466 |
| 7,873,036 B2 * | 1/2011 | Sreemanthula | ....... | H04W 48/16 |
| | | | | 370/328 |
| 8,027,679 B2 * | 9/2011 | Prasad | ................ | H04W 12/062 |
| | | | | 455/410 |

(Continued)

FOREIGN PATENT DOCUMENTS

| | | |
|---|---|---|
| WO | 2021/165934 A1 | 8/2021 |
| WO | 2021/223861 A1 | 11/2021 |
| WO | 2021/244758 A1 | 12/2021 |

OTHER PUBLICATIONS

Extended European Search Report received for corresponding European Patent Application No. 23190457.4, dated Dec. 13, 2023, 9 pages.

(Continued)

*Primary Examiner* — Hosuk Song
(74) *Attorney, Agent, or Firm* — SQUIRE PATTON BOGGS (US) LLP

(57)      ABSTRACT

There is provided an apparatus comprising means for determining a change of connection at a user equipment from a source access point to a target access point, and means for receiving, from the target access point, an indication that an associated gateway function is the same for the source access point and the target access point. The apparatus also comprising means for generating an access point key based on the received indication from the target access point, and means for securing communications with the target access point using the generated access point key.

20 Claims, 14 Drawing Sheets

(56) References Cited

U.S. PATENT DOCUMENTS

| | | | | |
|---|---|---|---|---|
| 8,144,728 | B2 * | 3/2012 | Ahmavaara | H04W 48/18 |
| | | | | 370/310 |
| 9,883,437 | B2 * | 1/2018 | Abraham | H04W 36/0061 |
| 10,313,156 | B2 * | 6/2019 | Ishii | H04L 12/4633 |
| 11,265,780 | B2 * | 3/2022 | Decarreau | H04W 36/0058 |
| 11,310,106 | B2 * | 4/2022 | Singla | H04W 24/08 |
| 11,968,581 | B2 * | 4/2024 | Van Wageningen | |
| | | | | H04B 10/1129 |

OTHER PUBLICATIONS

"Conclusions about Trusted Non-3GPP Access", SA WG2 Meeting #129bis, S2-1812598, Agenda Item: 6.7, Motorola Mobility, Nov. 26-30, 2018, 17 pages.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

"3rd Generation Partnership Project; Technical Specification Group Core Network and Terminals; Non-Access-Stratum (NAS) protocol for 5G System (5GS); Stage 3; (Release 17)", 3GPP TS 24.501, V17.7.1, Jun. 2022, pp. 1-991.

"IEEE 802.11", Wikipedia, Retrieved on Sep. 1, 2023, Webpage available at : https://en.wikipedia.org/wiki/IEEE_802.11.

"IEEE Standard for Information technology—Telecommunications and information exchange between systems Local and metropolitan area networks—Specific requirements Part 11: Wireless LAN Medium Access Control (MAC) and Physical Layer (PHY) Specifications", IEEE Computer Society, IEEE Std 802.11™-2012, Feb. 6, 2012, 2793 pages.

"LS on TNAP mobility security aspect", 3GPP TSG-SA3 Meeting #107-e, S3-221165, SA3, May 16-20, 2022, 1 page.

"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.

"New SID on security enhancement for mobility over non-3GPP access", 3GPP TSG-SA3 Meeting #112, S3-23xxxx, Agenda Item: 6, Nokia, Aug. 14-18, 2023, 5 pages.

Cao et al., "EAP Extensions for the EAP Re-authentication Protocol (ERP)", RFC 6696, Internet Engineering Task Force (IETF), Jul. 2012, pp. 1-47.

Eronen, "IKEv2 Mobility and Multihoming Protocol (MOBIKE)", RFC 4555, Network Working Group, Jun. 2006, pp. 1-33.

* cited by examiner

Figure 10

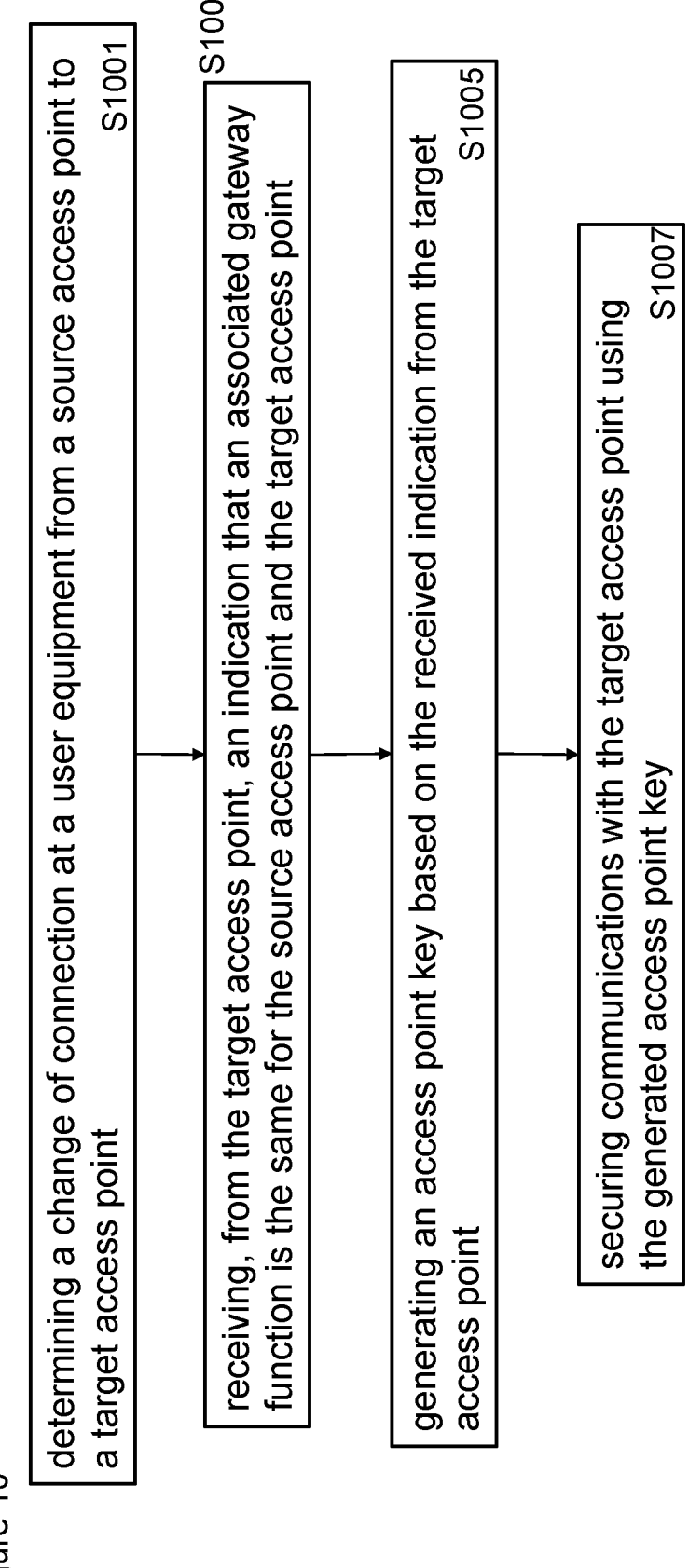

determining a change of connection at a user equipment from a source access point to a target access point
S1001 receiving, from the target access point, an indication that an associated gateway function is the same for the source access point and the target access point
S1003 generating an access point key based on the received indication from the target access point
S1005 securing communications with the target access point using the generated access point key
S1007 determining a change of connection for a user equipment from a source access point to a target access point                                                            S1101 generating an access point key based on the determination                           S1103 providing, to the target access point, an indication that an associated gateway function is the same for the source access point and the target access point, and the generated access point key                                                            S1105

Figure 12

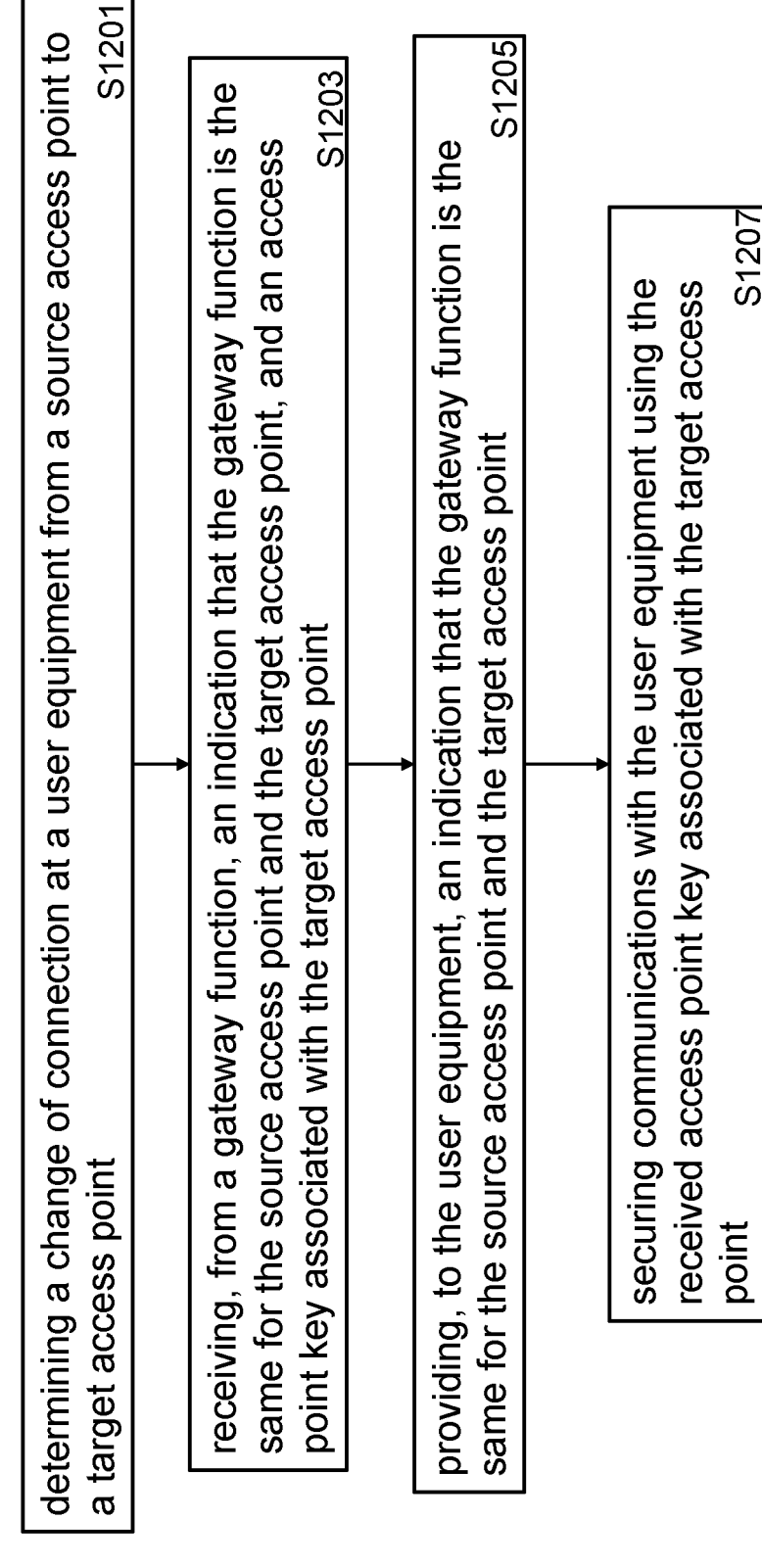

determining a change of connection at a user equipment from a source access point to a target access point    S1201 receiving, from a gateway function, an indication that the gateway function is the same for the source access point and the target access point, and an access point key associated with the target access point    S1203 providing, to the user equipment, an indication that the gateway function is the same for the source access point and the target access point    S1205 securing communications with the user equipment using the received access point key associated with the target access point    S1207

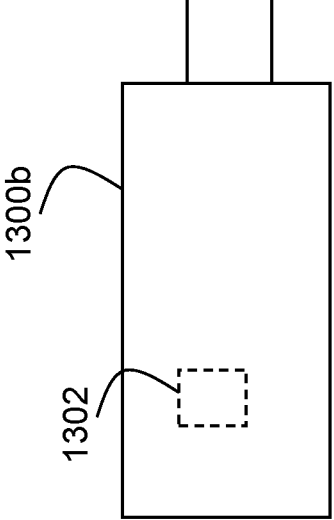
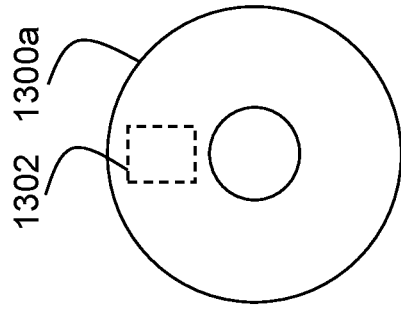
Figure 13

METHOD, APPARATUS AND COMPUTER PROGRAM

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus comprising: means for determining a change of connection at a user equipment from a source access point to a target access point; means for receiving, from the target access point, an indication that an associated gateway function is the same for the source access point and the target access point; means for generating an access point key based on the received indication from the target access point; and means for securing communications with the target access point using the generated access point key.

In an example, the access key is associated with the target access point.

In an example, the means for determining comprises: means for providing, to a gateway function, a request to change the connection of the user equipment from the source access point to the target access point.

In an example, the means for generating comprises: means for generating the access point key based on the received indication from the target access point, and a further access point key associated with the source access point.

In an example, the means for generating comprises: means for, in response to receiving the indication, generating the access point key using a further access point key associated with the source access point.

In an example, the apparatus comprises: means for receiving a random number value generated by the gateway function, and wherein the means for generating comprises: means for generating the access point key using the received random number value as an input parameter.

In an example, the apparatus comprises: means for maintaining a counter; means for, in response to receiving the indication, incrementing the counter, and wherein the means for generating comprises: means for generating the access point key using a current value of the counter as an input parameter.

In an example, the apparatus comprises: means for providing, to the gateway function, a further indication that the user equipment supports mobility between the source access point and the target access point.

In an example, the apparatus comprises: means for triggering a change of connection from a source access point to a target access point at the user equipment.

In an example, the apparatus comprises: means for receiving, from the target access point, an identity request for an identity of the user equipment.

In an example, the request comprises: an identity of the user equipment, and a flag indicating a request to change connection from the source access point to the target access point.

In an example, the means for securing communications with the target access point comprises: means for performing a four-way handshake with the target access point using the generated access point key, in order to establish a connection with the target access point.

In an example, the apparatus comprises: means for providing, to the gateway function, a message with a request for the gateway function to update a security association address of the user equipment.

In an example, the apparatus comprises: means for receiving, from the gateway function, a response message indicating that the security association address of the user equipment has been successfully updated.

In an example, the source and target access points are trusted non-3GPP access points.

In an example, the apparatus comprises the user equipment, is the user equipment, or is comprised in the user equipment.

According to an aspect, there is provided an apparatus comprising: means for determining a change of connection for a user equipment from a source access point to a target access point; means for generating an access point key based on the determination; and means for providing, to the target access point, an indication that an associated gateway function is the same for the source access point and the target access point, and the generated access point key.

In an example, the means for determining comprises: means for receiving, from the user equipment, a request to change the connection of the user equipment from the source access point to the target access point.

In an example, the means for generating comprises: means for generating the access point key using a further access point key associated with the source access point.

In an example, the apparatus comprises: means for generating a random number value, and wherein the means for generating comprises: means for generating the access point key using the random number value as an input parameter.

In an example, the apparatus comprises: means for maintaining a counter; means for, in response to determining the change of connection, incrementing the counter, and wherein the means for generating comprises: means for generating the access point key using a current value of the counter as an input parameter.

In an example, the apparatus comprises: means for receiving, from the user equipment, a further indication that the user equipment supports mobility between the source access point and the target access point.

In an example, the apparatus comprises: means for receiving, from the user equipment, a message with a request to update a security association address of the user equipment.

In an example, the apparatus comprises: means for providing, to the user equipment, a response message indicating that the security association address of the user equipment has been successfully updated.

In an example, the apparatus comprises the gateway function, is the gateway function, or is comprised in the gateway function.

According to an aspect, there is provided an apparatus comprising: means for determining a change of connection at a user equipment from a source access point to a target access point; means for receiving, from a gateway function, an indication that the gateway function is the same for the source access point and the target access point, and an access point key associated with the target access point; means for providing, to the user equipment, an indication that the gateway function is the same for the source access point and the target access point; and means for securing communications with the user equipment using the received access point key associated with the target access point.

In an example, the means for determining comprises: means for receiving, from the user equipment, a request to change the connection of the user equipment from the source access point to the target access point.

In an example, the apparatus comprises: means for providing, to the gateway function, a further indication that the user equipment supports mobility between the source access point and the target access point.

In an example, the apparatus comprises: means for providing, to the user equipment, an identity request for an identity of the user equipment.

In an example, the request comprises: an identity of the user equipment, and a flag indicating a request to change connection from the source access point to the target access point.

In an example, the means for securing communications with the user equipment comprises: means for performing a four-way handshake with the user equipment using the received access point key, in order to establish a connection with the target access point.

In an example, the apparatus comprises the target access point, is the target access point, or is comprised in the target access point.

According to an aspect, there is provided a method comprising: determining a change of connection at a user equipment from a source access point to a target access point; receiving, from the target access point, an indication that an associated gateway function is the same for the source access point and the target access point; generating an access point key based on the received indication from the target access point; and securing communications with the target access point using the generated access point key.

In an example, the access key is associated with the target access point.

In an example, the determining comprises: providing, to a gateway function, a request to change the connection of the user equipment from the source access point to the target access point.

In an example, the generating comprises: generating the access point key based on the received indication from the target access point, and a further access point key associated with the source access point.

In an example, the generating comprises: in response to receiving the indication, generating the access point key using a further access point key associated with the source access point.

In an example, the method comprises: receiving a random number value generated by the gateway function, and wherein the generating comprises: generating the access point key using the received random number value as an input parameter.

In an example, the method comprises: maintaining a counter; in response to receiving the indication, incrementing the counter, and wherein the generating comprises: generating the access point key using a current value of the counter as an input parameter.

In an example, the method comprises: providing, to the gateway function, a further indication that the user equipment supports mobility between the source access point and the target access point.

In an example, the method comprises: triggering a change of connection from a source access point to a target access point at the user equipment.

In an example, the method comprises: receiving, from the target access point, an identity request for an identity of the user equipment.

In an example, the request comprises: an identity of the user equipment, and a flag indicating a request to change connection from the source access point to the target access point.

In an example, the securing communications with the target access point comprises: performing a four-way handshake with the target access point using the generated access point key, in order to establish a connection with the target access point.

In an example, the method comprises: providing, to the gateway function, a message with a request for the gateway function to update a security association address of the user equipment.

In an example, the method comprises: receiving, from the gateway function, a response message indicating that the security association address of the user equipment has been successfully updated.

In an example, the source and target access points are trusted non-3GPP access points.

In an example, the method is performed by the user equipment.

According to an aspect, there is provided a method comprising: determining a change of connection for a user equipment from a source access point to a target access point; generating an access point key based on the determination; and providing, to the target access point, an indication that an associated gateway function is the same for the source access point and the target access point, and the generated access point key.

In an example, the determining comprises: receiving, from the user equipment, a request to change the connection of the user equipment from the source access point to the target access point.

In an example, the generating comprises: generating the access point key using a further access point key associated with the source access point.

In an example, the method comprises: generating a random number value, and wherein the generating comprises: generating the access point key using the random number value as an input parameter.

In an example, the method comprises: maintaining a counter; in response to determining the change of connection, incrementing the counter, and wherein the generating comprises: generating the access point key using a current value of the counter as an input parameter.

In an example, the method comprises: receiving, from the user equipment, a further indication that the user equipment supports mobility between the source access point and the target access point.

In an example, the method comprises: receiving, from the user equipment, a message with a request to update a security association address of the user equipment.

In an example, the method comprises: providing, to the user equipment, a response message indicating that the security association address of the user equipment has been successfully updated.

In an example, the method is performed by the gateway function.

According to an aspect, there is provided a method comprising: determining a change of connection at a user equipment from a source access point to a target access point; receiving, from a gateway function, an indication that the gateway function is the same for the source access point and the target access point, and an access point key associated with the target access point; providing, to the user equipment, an indication that the gateway function is the same for the source access point and the target access point; and securing communications with the user equipment using the received access point key associated with the target access point.

In an example, the determining comprises: receiving, from the user equipment, a request to change the connection of the user equipment from the source access point to the target access point.

In an example, the method comprises: providing, to the gateway function, a further indication that the user equipment supports mobility between the source access point and the target access point.

In an example, the method comprises: providing, to the user equipment, an identity request for an identity of the user equipment.

In an example, the request comprises: an identity of the user equipment, and a flag indicating a request to change connection from the source access point to the target access point.

In an example, the securing communications with the user equipment comprises: performing a four-way handshake with the user equipment using the received access point key, in order to establish a connection with the target access point.

In an example, the method is performed by the target access point.

According to an aspect, there is provided an apparatus comprising: at least one processor; and at least one memory storing instructions that, when executed by the at least one processor, cause the apparatus at least to: determining a change of connection at a user equipment from a source access point to a target access point; receiving, from the target access point, an indication that an associated gateway function is the same for the source access point and the target access point; generating an access point key based on the received indication from the target access point; and securing communications with the target access point using the generated access point key.

In an example, the access key is associated with the target access point.

In an example, the determining comprises: providing, to a gateway function, a request to change the connection of the user equipment from the source access point to the target access point.

In an example, the generating comprises: generating the access point key based on the received indication from the target access point, and a further access point key associated with the source access point.

In an example, the generating comprises: in response to receiving the indication, generating the access point key using a further access point key associated with the source access point.

In an example, the apparatus is caused to perform: receiving a random number value generated by the gateway function, and wherein the generating comprises: generating the access point key using the received random number value as an input parameter.

In an example, the apparatus is caused to perform: maintaining a counter; in response to receiving the indication, incrementing the counter, and wherein the generating comprises: generating the access point key using a current value of the counter as an input parameter.

In an example, the apparatus is caused to perform: providing, to the gateway function, a further indication that the user equipment supports mobility between the source access point and the target access point.

In an example, the apparatus is caused to perform: triggering a change of connection from a source access point to a target access point at the user equipment.

In an example, the apparatus is caused to perform: receiving, from the target access point, an identity request for an identity of the user equipment.

In an example, the request comprises: an identity of the user equipment, and a flag indicating a request to change connection from the source access point to the target access point.

In an example, the securing communications with the target access point comprises: performing a four-way handshake with the target access point using the generated access point key, in order to establish a connection with the target access point.

In an example, the apparatus is caused to perform: providing, to the gateway function, a message with a request for the gateway function to update a security association address of the user equipment.

In an example, the apparatus is caused to perform: receiving, from the gateway function, a response message indicating that the security association address of the user equipment has been successfully updated.

In an example, the source and target access points are trusted non-3GPP access points.

In an example, the apparatus comprises the user equipment, is the user equipment, or is comprised in the user equipment.

According to an aspect, there is provided an apparatus comprising: at least one processor; and at least one memory storing instructions that, when executed by the at least one processor, cause the apparatus at least to: determining a change of connection for a user equipment from a source access point to a target access point; generating an access point key based on the determination; and providing, to the target access point, an indication that an associated gateway function is the same for the source access point and the target access point, and the generated access point key.

In an example, the determining comprises: receiving, from the user equipment, a request to change the connection of the user equipment from the source access point to the target access point.

In an example, the generating comprises: generating the access point key using a further access point key associated with the source access point.

In an example, the apparatus is caused to perform: generating a random number value, and wherein the generating comprises: generating the access point key using the random number value as an input parameter.

In an example, the apparatus is caused to perform: maintaining a counter; in response to determining the change of connection, incrementing the counter, and wherein the generating comprises: generating the access point key using a current value of the counter as an input parameter.

In an example, the apparatus is caused to perform: receiving, from the user equipment, a further indication that the user equipment supports mobility between the source access point and the target access point.

In an example, the apparatus is caused to perform: receiving, from the user equipment, a message with a request to update a security association address of the user equipment.

In an example, the apparatus is caused to perform: providing, to the user equipment, a response message indicating that the security association address of the user equipment has been successfully updated.

In an example, the apparatus comprises the gateway function, is the gateway function, or is comprised in the gateway function.

According to an aspect, there is provided an apparatus comprising: at least one processor; and at least one memory storing instructions that, when executed by the at least one processor, cause the apparatus at least to: determining a change of connection at a user equipment from a source access point to a target access point; receiving, from a gateway function, an indication that the gateway function is the same for the source access point and the target access point, and an access point key associated with the target access point; providing, to the user equipment, an indication that the gateway function is the same for the source access point and the target access point; and securing communications with the user equipment using the received access point key associated with the target access point.

In an example, the determining comprises: receiving, from the user equipment, a request to change the connection of the user equipment from the source access point to the target access point.

In an example, the apparatus is caused to perform: providing, to the gateway function, a further indication that the user equipment supports mobility between the source access point and the target access point.

In an example, the apparatus is caused to perform: providing, to the user equipment, an identity request for an identity of the user equipment.

In an example, the request comprises: an identity of the user equipment, and a flag indicating a request to change connection from the source access point to the target access point.

In an example, the securing communications with the user equipment comprises: performing a four-way handshake with the user equipment using the received access point key, in order to establish a connection with the target access point.

In an example, the apparatus comprises the target access point, is the target access point, or is comprised in the target access point.

According to an aspect, there is provided computer program comprising instructions stored thereon for performing at least the following: determining a change of connection at a user equipment from a source access point to a target access point; receiving, from the target access point, an indication that an associated gateway function is the same for the source access point and the target access point; generating an access point key based on the received indication from the target access point; and securing communications with the target access point using the generated access point key.

According to an aspect, there is provided a computer program comprising instructions stored thereon for performing at least the following: determining a change of connection for a user equipment from a source access point to a target access point; generating an access point key based on the determination; and providing, to the target access point, an indication that an associated gateway function is the same for the source access point and the target access point, and the generated access point key.

According to an aspect, there is provided computer program comprising instructions stored thereon for performing at least the following: determining a change of connection at a user equipment from a source access point to a target access point; receiving, from a gateway function, an indication that the gateway function is the same for the source access point and the target access point, and an access point key associated with the target access point; providing, to the user equipment, an indication that the gateway function is the same for the source access point and the target access point; and securing communications with the user equipment using the received access point key associated with the target access point.

According to an aspect, there is provided an apparatus comprising: means for providing, to the gateway function, an indication that the user equipment supports mobility between the source access point and the target access point, the indication indicating that the user equipment supports changing from a first IP address to a second IP address, the first IP address associated with the source access point and the second IP address associated with the target access point; means for providing, to a gateway function, a request to change the connection of the user equipment from the source access point to the target access point, the request indicating the second IP address; and means for receiving, from the gateway function, an acknowledgment that the user equipment is associated with the first IP address and the second IP address at the gateway function.

In an example, the apparatus means for determining a change of connection at a user equipment from a source access point to a target access point; means for receiving, from the target access point, an indication that an associated gateway function is the same for the source access point and the target access point; means for generating an access point key based on the received indication from the target access point; and means for securing communications with the target access point using the generated access point key.

In an example, the access key is associated with the target access point.

In an example, the means for determining comprises: means for providing, to a gateway function, a request to change the connection of the user equipment from the source access point to the target access point.

In an example, the means for generating comprises: means for generating the access point key based on the received indication from the target access point, and a further access point key associated with the source access point.

In an example, the means for generating comprises: means for, in response to receiving the indication, generating the access point key using a further access point key associated with the source access point.

In an example, the apparatus comprises: means for receiving a random number value generated by the gateway function, and wherein the means for generating comprises: means for generating the access point key using the received random number value as an input parameter.

In an example, the apparatus comprises: means for maintaining a counter;

means for, in response to receiving the indication, incrementing the counter, and wherein the means for generating comprises: means for generating the access point key using a current value of the counter as an input parameter.

In an example, the apparatus comprises: means for providing, to the gateway function, a further indication that the user equipment supports mobility between the source access point and the target access point.

In an example, the apparatus comprises: means for triggering a change of connection from a source access point to a target access point at the user equipment.

In an example, the apparatus comprises: means for receiving, from the target access point, an identity request for an identity of the user equipment.

In an example, the request comprises: an identity of the user equipment, and a flag indicating a request to change connection from the source access point to the target access point.

In an example, the means for securing communications with the target access point comprises: means for performing a four-way handshake with the target access point using the generated access point key, in order to establish a connection with the target access point.

In an example, the apparatus comprises: means for providing, to the gateway function, a message with a request for the gateway function to update a security association address of the user equipment.

In an example, the apparatus comprises: means for receiving, from the gateway function, a response message indicating that the security association address of the user equipment has been successfully updated.

In an example, the source and target access points are trusted non-3GPP access points.

In an example, the apparatus comprises the user equipment, is the user equipment, or is comprised in the user equipment.

According to an aspect, there is provided an apparatus comprising: means for receiving, from a user equipment, an indication that the user equipment supports mobility between the source access point and the target access point, the indication indicating that the user equipment supports changing from a first IP address to a second IP address, the first IP address associated with the source access point and the second IP address associated with the target access point; means for receiving, from the user equipment, a request to change the connection of the user equipment from the source access point to the target access point, the request indicating the second IP address; and means for providing, to the user equipment, an acknowledgment that the user equipment is associated with the first IP address and the second IP address at the gateway function.

In an example, the apparatus comprises: means for determining a change of connection for a user equipment from a source access point to a target access point; means for generating an access point key based on the determination; and means for providing, to the target access point, an indication that an associated gateway function is the same for the source access point and the target access point, and the generated access point key.

In an example, the means for determining comprises: means for receiving, from the user equipment, a request to change the connection of the user equipment from the source access point to the target access point.

In an example, the means for generating comprises: means for generating the access point key using a further access point key associated with the source access point.

In an example, the apparatus comprises: means for generating a random number value, and wherein the means for generating comprises: means for generating the access point key using the random number value as an input parameter.

In an example, the apparatus comprises: means for maintaining a counter; means for, in response to determining the change of connection, incrementing the counter, and wherein the means for generating comprises: means for generating the access point key using a current value of the counter as an input parameter.

In an example, the apparatus comprises: means for receiving, from the user equipment, a further indication that the user equipment supports mobility between the source access point and the target access point.

In an example, the apparatus comprises: means for receiving, from the user equipment, a message with a request to update a security association address of the user equipment.

In an example, the apparatus comprises: means for providing, to the user equipment, a response message indicating that the security association address of the user equipment has been successfully updated.

In an example, the apparatus comprises the gateway function, is the gateway function, or is comprised in the gateway function.

According to an aspect, there is provided a method comprising: providing, to the gateway function, an indication that a user equipment supports mobility between the source access point and the target access point, the indication indicating that the user equipment supports changing from a first IP address to a second IP address, the first IP address associated with the source access point and the second IP address associated with the target access point; providing, to a gateway function, a request to change the connection of the user equipment from the source access point to the target access point, the request indicating the second IP address; and receiving, from the gateway function, an acknowledgment that the user equipment is associated with the first IP address and the second IP address at the gateway function.

In an example, the method comprises: determining a change of connection at a user equipment from a source access point to a target access point; receiving, from the target access point, an indication that an associated gateway function is the same for the source access point and the target access point; generating an access point key based on the received indication from the target access point; and securing communications with the target access point using the generated access point key.

In an example, the access key is associated with the target access point.

In an example, the determining comprises: providing, to a gateway function, a request to change the connection of the user equipment from the source access point to the target access point.

In an example, the generating comprises: generating the access point key based on the received indication from the target access point, and a further access point key associated with the source access point.

In an example, the generating comprises: in response to receiving the indication, generating the access point key using a further access point key associated with the source access point.

In an example, the method comprises: receiving a random number value generated by the gateway function, and wherein the generating comprises: generating the access point key using the received random number value as an input parameter.

In an example, the method comprises: maintaining a counter; in response to receiving the indication, incrementing the counter, and wherein the generating comprises: generating the access point key using a current value of the counter as an input parameter.

In an example, the method comprises: providing, to the gateway function, a further indication that the user equipment supports mobility between the source access point and the target access point.

In an example, the method comprises: triggering a change of connection from a source access point to a target access point at the user equipment.

In an example, the method comprises: receiving, from the target access point, an identity request for an identity of the user equipment.

In an example, the request comprises: an identity of the user equipment, and a flag indicating a request to change connection from the source access point to the target access point.

In an example, the securing communications with the target access point comprises: performing a four-way handshake with the target access point using the generated access point key, in order to establish a connection with the target access point.

In an example, the method comprises: providing, to the gateway function, a message with a request for the gateway function to update a security association address of the user equipment.

In an example, the method comprises: receiving, from the gateway function, a response message indicating that the security association address of the user equipment has been successfully updated.

In an example, the source and target access points are trusted non-3GPP access points.

In an example, the method is performed by the user equipment.

According to an aspect, there is provided method comprising: receiving, from a user equipment, an indication that the user equipment supports mobility between the source access point and the target access point, the indication indicating that the user equipment supports changing from a first IP address to a second IP address, the first IP address associated with the source access point and the second IP address associated with the target access point; receiving, from the user equipment, a request to change the connection of the user equipment from the source access point to the target access point, the request indicating the second IP address; and providing, to the user equipment, an acknowledgment that the user equipment is associated with the first IP address and the second IP address at the gateway function.

In an example, the method comprises: determining a change of connection for a user equipment from a source access point to a target access point; generating an access point key based on the determination; and providing, to the target access point, an indication that an associated gateway function is the same for the source access point and the target access point, and the generated access point key.

In an example, the determining comprises: receiving, from the user equipment, a request to change the connection of the user equipment from the source access point to the target access point.

In an example, the generating comprises: generating the access point key using a further access point key associated with the source access point.

In an example, the method comprises: generating a random number value, and wherein the generating comprises: generating the access point key using the random number value as an input parameter.

In an example, the method comprises: maintaining a counter; in response to determining the change of connection, incrementing the counter, and wherein the generating comprises: generating the access point key using a current value of the counter as an input parameter.

In an example, the method comprises: receiving, from the user equipment, a further indication that the user equipment supports mobility between the source access point and the target access point.

In an example, the method comprises: receiving, from the user equipment, a message with a request to update a security association address of the user equipment.

In an example, the method comprises: providing, to the user equipment, a response message indicating that the security association address of the user equipment has been successfully updated.

In an example, the method is performed by the gateway function.

According to an aspect, there is provided an apparatus comprising: at least one processor; and at least one memory storing instructions that, when executed by the at least one processor, cause the apparatus at least to: providing, to the gateway function, an indication that a user equipment supports mobility between the source access point and the target access point, the indication indicating that the user equipment supports changing from a first IP address to a second IP address, the first IP address associated with the source access point and the second IP address associated with the target access point; providing, to a gateway function, a request to change the connection of the user equipment from the source access point to the target access point, the request indicating the second IP address; and receiving, from the gateway function, an acknowledgment that the user equipment is associated with the first IP address and the second IP address at the gateway function.

According to an aspect, there is provided an apparatus comprising: at least one processor; and at least one memory storing instructions that, when executed by the at least one processor, cause the apparatus at least to: receiving, from a user equipment, an indication that the user equipment supports mobility between the source access point and the target access point, the indication indicating that the user equipment supports changing from a first IP address to a second IP address, the first IP address associated with the source access point and the second IP address associated with the target access point; receiving, from the user equipment, a request to change the connection of the user equipment from the source access point to the target access point, the request indicating the second IP address; and providing, to the user equipment, an acknowledgment that the user equipment is associated with the first IP address and the second IP address at the gateway function.

According to an aspect, there is provided computer program comprising instructions stored thereon for performing at least the following: providing, to the gateway function, an indication that a user equipment supports mobility between the source access point and the target access point, the indication indicating that the user equipment supports changing from a first IP address to a second IP address, the first IP address associated with the source access point and the second IP address associated with the target access point; providing, to a gateway function, a request to change the connection of the user equipment from the source access point to the target access point, the request indicating the second IP address; and receiving, from the gateway function, an acknowledgment that the user equipment is associated with the first IP address and the second IP address at the gateway function.

According to an aspect, there is provided computer program comprising instructions stored thereon for performing at least the following: receiving, from a user equipment, an indication that the user equipment supports mobility between the source access point and the target access point, the indication indicating that the user equipment supports changing from a first IP address to a second IP address, the first IP address associated with the source access point and the second IP address associated with the target access point; receiving, from the user equipment, a request to change the connection of the user equipment from the source access point to the target access point, the request indicating the second IP address; and providing, to the user equipment, an acknowledgment that the user equipment is associated with the first IP address and the second IP address at the gateway function.

According to an aspect, there is provided a computer program comprising instructions, which when executed by an apparatus, cause the apparatus to perform the methods as described herein.

A computer product stored on a medium may cause an apparatus to perform the methods as described herein.

A non-transitory computer readable medium comprising program instructions, that, when executed by an apparatus, cause the apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

LIST OF ABBREVIATIONS

AF: Application Function
AMF: Access Management Function
AN: Access Network
BS: Base Station
CN: Core Network
DL: Downlink
eNB: eNodeB
gNB: gNodeB
IIoT: Industrial Internet of Things
IKEv2: Internet Key Exchange Version 2
IPSec: Internet Protocol Security
LTE: Long Term Evolution
NEF: Network Exposure Function
NG-RAN: Next Generation Radio Access Network
NF: Network Function
NR: New Radio
NRF: Network Repository Function
NW: Network
MS: Mobile Station
PCF Policy Control Function
PLMN: Public Land Mobile Network RAN: Radio Access Network
RF: Radio Frequency
SMF: Session Management Function
TNAN: Trusted Non-3GPP Access Network
TNAP: Trusted Non-3GPP Access Point
TNGF: Trusted Non-3GPP Gateway Function
UE: User Equipment
UDR: Unified Data Repository
UDM: Unified Data Management
UL: Uplink
UPF: User Plane Function
3GPP: $3^{rd}$ Generation Partnership Project
5G: $5^{th}$ Generation
5GC: 5G Core network
5G-AN: 5G Radio Access Network
5GS: 5G System

DESCRIPTION OF FIGURES

Embodiments will now be described, by way of example only, with reference to the accompanying Figures in which:

FIG. 10 shows an example method flow diagram performed by a user equipment;

FIG. 12 shows an example method flow diagram performed by an access point; and

FIG. 13 shows a schematic representation of a non-volatile memory medium storing instructions which when executed by a processor allow a processor to perform one or more of the steps of the method of FIGS. 10 to 12.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
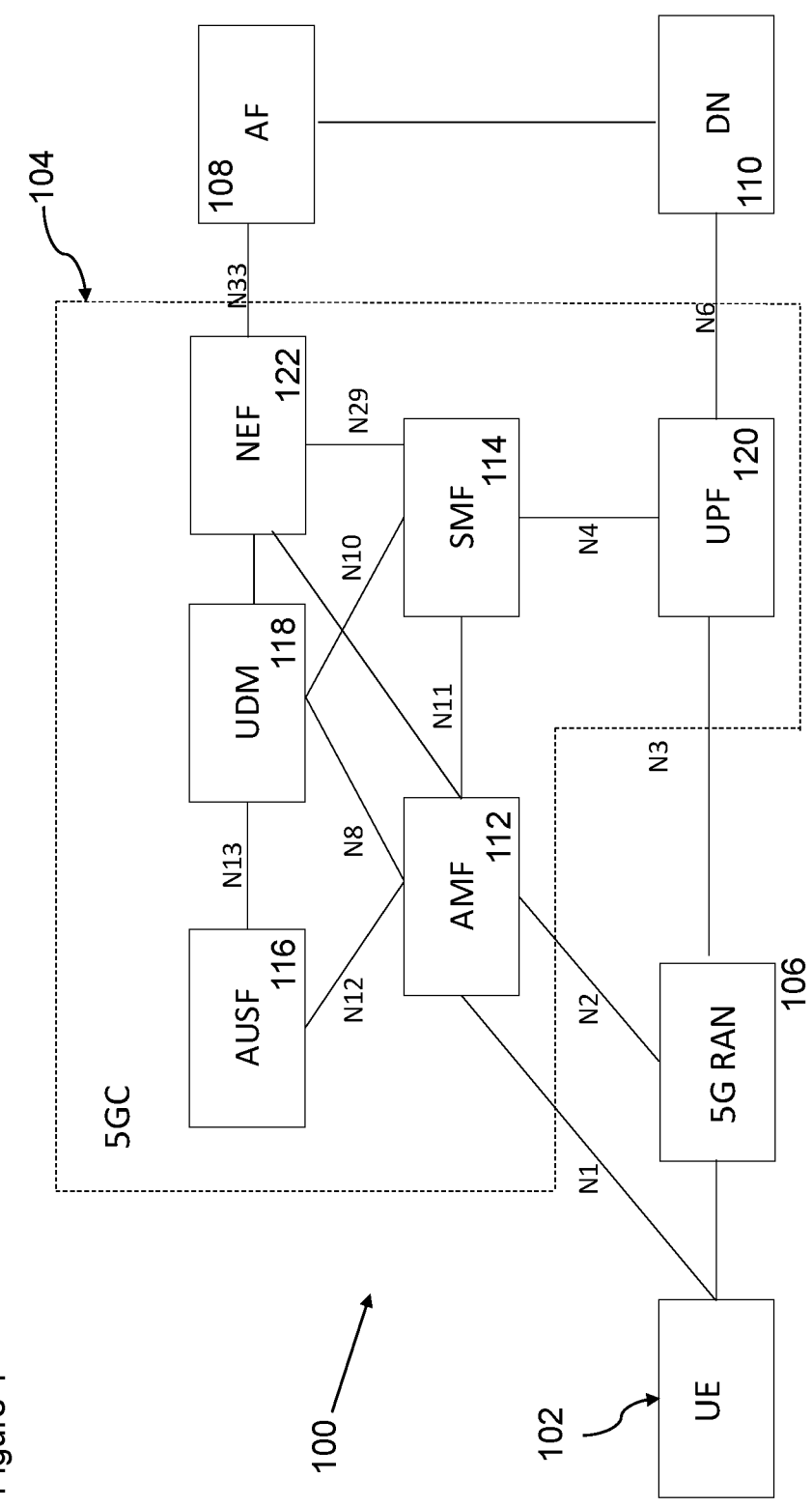
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a device 102 such as user equipment or terminal, a 5G radio access network (5G-RAN) 106, a 5G core network (5GC) 104, one or more network functions (NF), one or more application function (AF) 108 and one or more data networks (DN) 110.

The 5G-RAN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
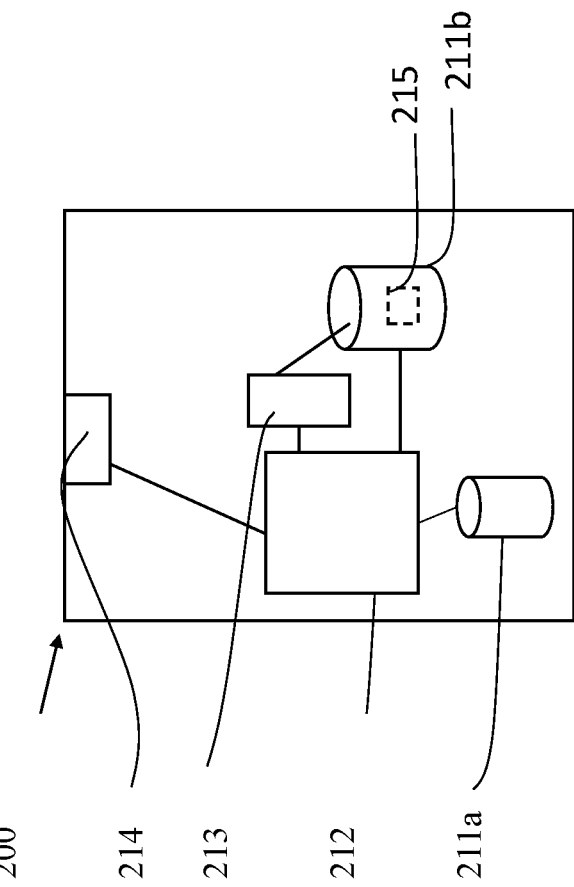
FIG. 2 shows a schematic representation of a control apparatus.

FIG. 2 illustrates an example of a control apparatus 200 for controlling a function of the 5G-RAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G-AN or the 5GC. In some examples, each function of the 5G-RAN or the 5GC comprises a control apparatus 200. In alternative examples, two or more functions of the 5G-AN or the 5GC may share a control apparatus.

Figure 3:
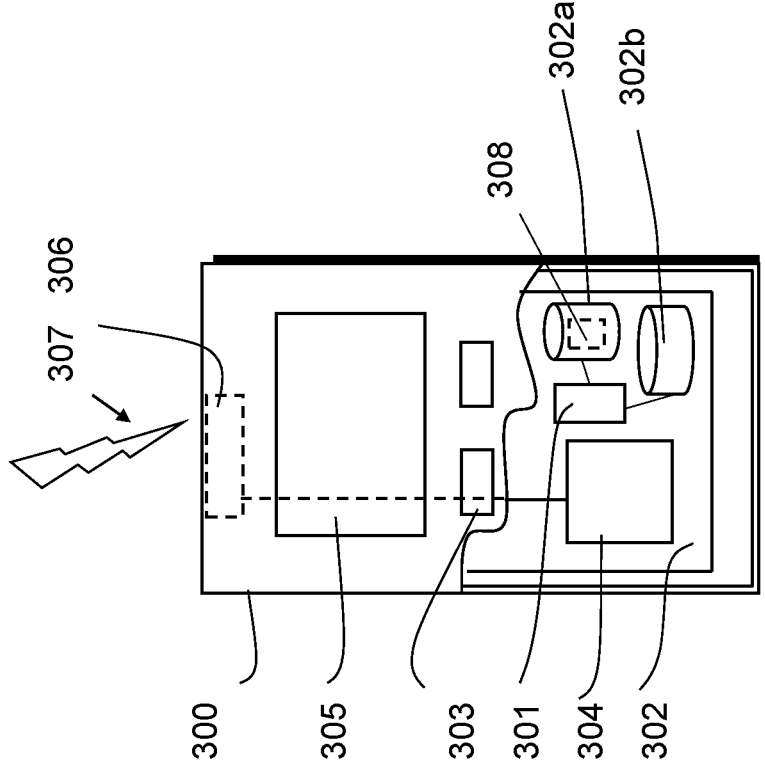
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

The 5G core network (5GCN) supports the connectivity of the UE via non-3GPP access networks. An example of a non-3GPP access network is a wireless local area network (WLAN). These non-3GPP access networks can be trusted non-3GPP access networks, untrusted non-3GPP access networks or wireline access networks. A trusted or untrusted non-3GPP access network can advertise the public land mobile networks (PLMNs) for which it supports: i) trusted connectivity, and ii) the type of supported trusted connectivity. Different types of trusted connectivity may be advertised so that a UE can discover the non-3GPP access networks that can provide connectivity to one or more PLMNs. Information that may be advertised may include, for example: a) information about PLMN list(s) with 5G connectivity using trusted non-3GPP access, b) information about PLMN list(s) with 5G connectivity without the non-access stratum (NAS) using trusted non-3GPP access, or c) information about PLMN list with (interface) S2a connectivity using trusted non-3GPP access (access via non-3GPP access to the evolved packet core (EPC)).

Figure 4:
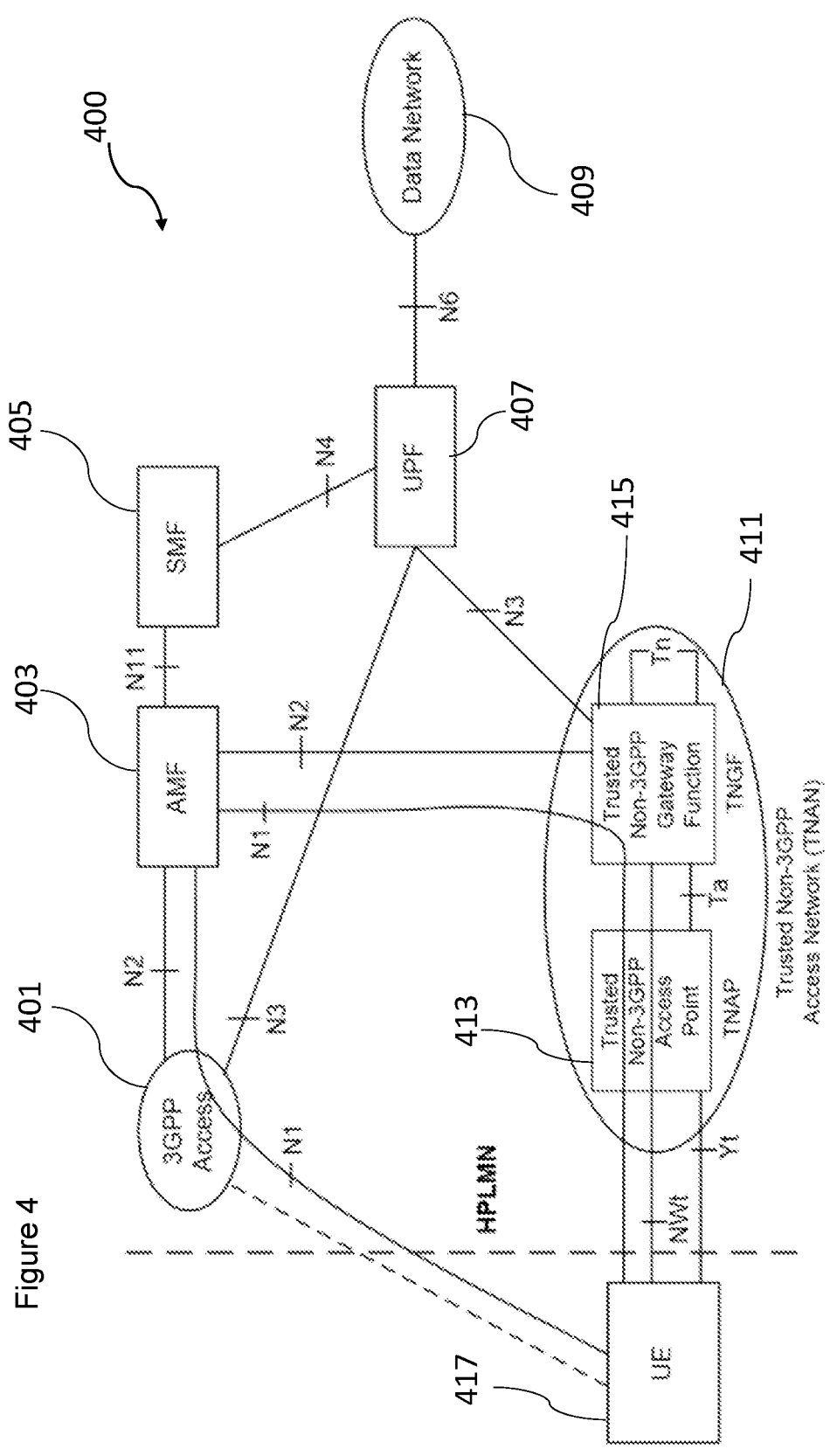
FIG. 4 shows a schematic representation of a 5G system with a trusted non-3GPP access network.

For a trusted non-3GPP access network, the entity hosting the non-3GPP access is trusted by the 5GCN operator. A trusted non-3GPP access network is connected to the 5GCN via a trusted non-3GPP gateway function (TNGF) as specified in 3GPP 23.501. This is shown in FIG. 4, which is discussed in more detail below. The TNGF interfaces the 5GCN control plane (CP) function via the N2 interface to the AMF and the 5GCN user plane (UP) functions via the N3 interface to the UPF as described in 3GPP TS 23.501.

FIG. 4 shows a schematic representation of a 5G system with a trusted non-3GPP access network.

The system 400 comprises a 3GPP access node 401, an AMF 403, an SMF 405, and a UPF 407. The UPF 407 is connected to a data network 409. The system 400 also comprises a trusted non-3GPP access network (TNAN) 411. The TNAN 411 comprises a trusted non-3GPP access point 413 and a trusted non-3GPP gateway function (TNGF) 415. The TNAN 411 is connected to a UE 417. The TNAN 411 is also connected to the AMF 403 and the UPF 407. As well as being connected to the TNAN 411, the UE 417 is connected to the 3GPP access node 401.

The 3GPP access node 401, the AMF 403, the SMF 405, the UPF 407, the data network 409 and the TNAN 411 may be comprised within a home PLMN.

For the TNAN 411, the UE 417 establishes a secure connection to the 5GCN over a trusted non-3GPP access to the TNGF 415. The UE 417 and the 3GPP network 400 authenticates each other using 3GPP-based authentication protocols, i) 5G AKA or ii) EAP-AKA', as defined in TS 33.501 for connecting to a non-3GPP access and establishes an internet protocol security (IPsec) security association (SA) with the TNGF 415 at the end of a successful registration procedure as specified in 3GPP TS 24.501. After the registration, the UE 417 supports secured NAS signalling with the 5GCN using the N1 reference point to the AMF 403.

Figure 5:
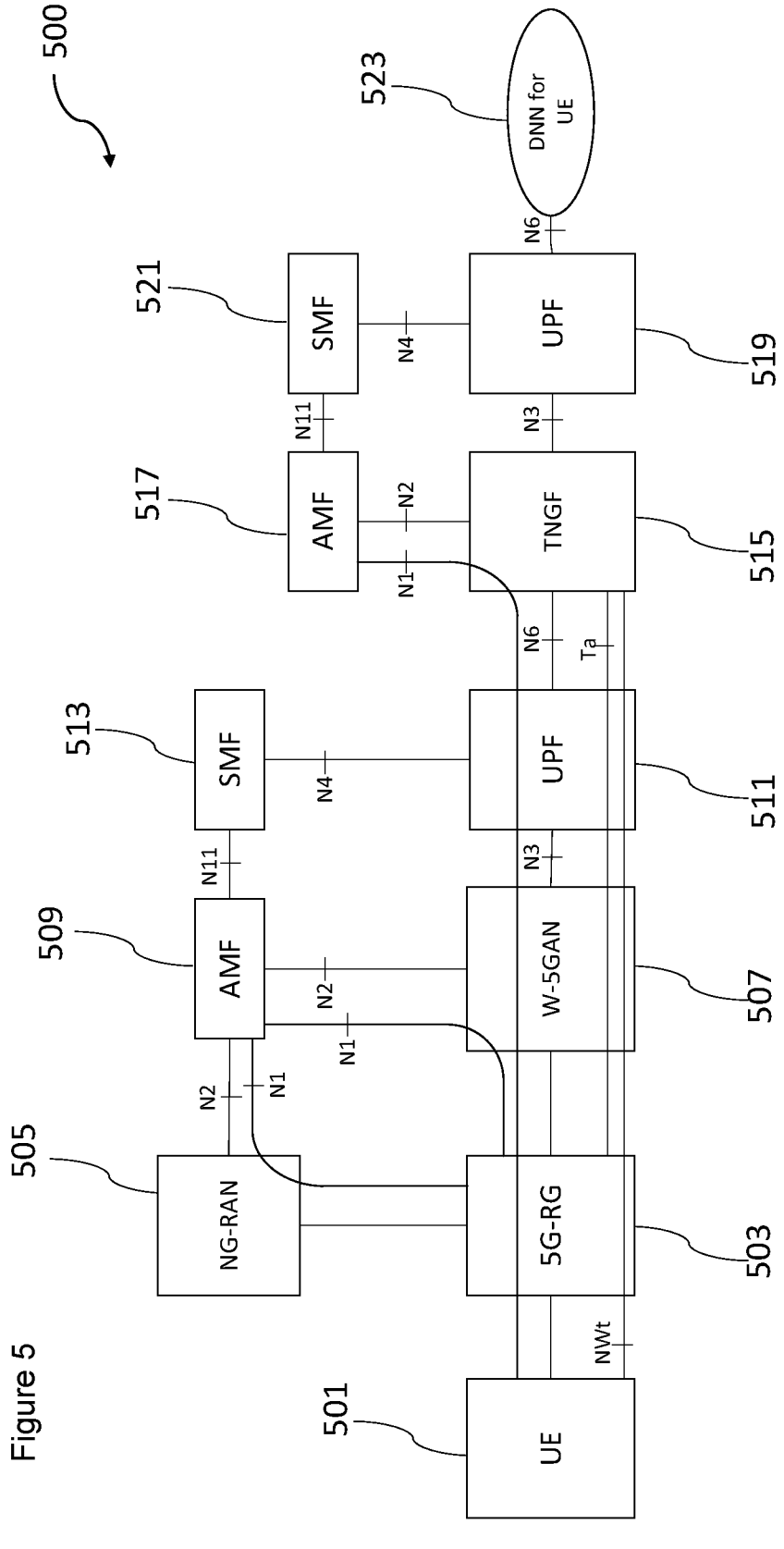
FIG. 5 shows a schematic representation of a non-roaming architecture for a user equipment behind a 5G-residential gateway using trusted non-3GPP access.

FIG. 5 shows a schematic representation of a non-roaming architecture for a user equipment behind a 5G-residential gateway using trusted non-3GPP access.

The system 500 comprises a UE 501 which is connected to a 5G residential gateway 503. The 5G residential gateway 503 is connected to an NG-RAN 505 and a W-5GAN 507. The W-5GAN 507 is also connected to an AMF 509 and a UPF 511. The UPF 511 is also connected to an SMF 513. The UPF 511 is also connected to a TNGF 515. The TNGF 515 is connected to a further AMF 517 and a further UPF 519. The further UPF 519 is also connected to a further SMF 521 and a data network name (DNN) 523 for the UE. The NG-RAN is connected to the AMF 509, with the AMF 509 also connected to the SMF 513.

In systems such as the ones shown in FIGS. 4 and 5, a TNAP identifier may be defined. In the case of trusted non-3GPP access, the TNAP Identifier may be based on a UE local IP address used to reach the TNGF, and optionally a user datagram protocol (UDP) source port number if network address translation (NAT) is detected. When the UE uses a wireless local area network (WLAN) based on IEEE 802.11 technology to reach the TNGF, the TNAP Identifier may include a service set identifier (SSID) of the access point to which the UE is attached. The TNAP identifier may include at least one of the following elements, unless otherwise determined by the trusted wireless local area network (TWAN) operator's policies: a) the basic service set identifier (BSSID), b) civic address information of the TNAP to which the UE is attached.

A UE may decide to use trusted non-3GPP access for connecting to 5GC in a specific PLMN based on advertised capabilities of the discovered non-3GPP access networks. For example, one or more available non-3GPP access networks advertise support of trusted connectivity to 5GC in a specific PLMN.

Figure 6:
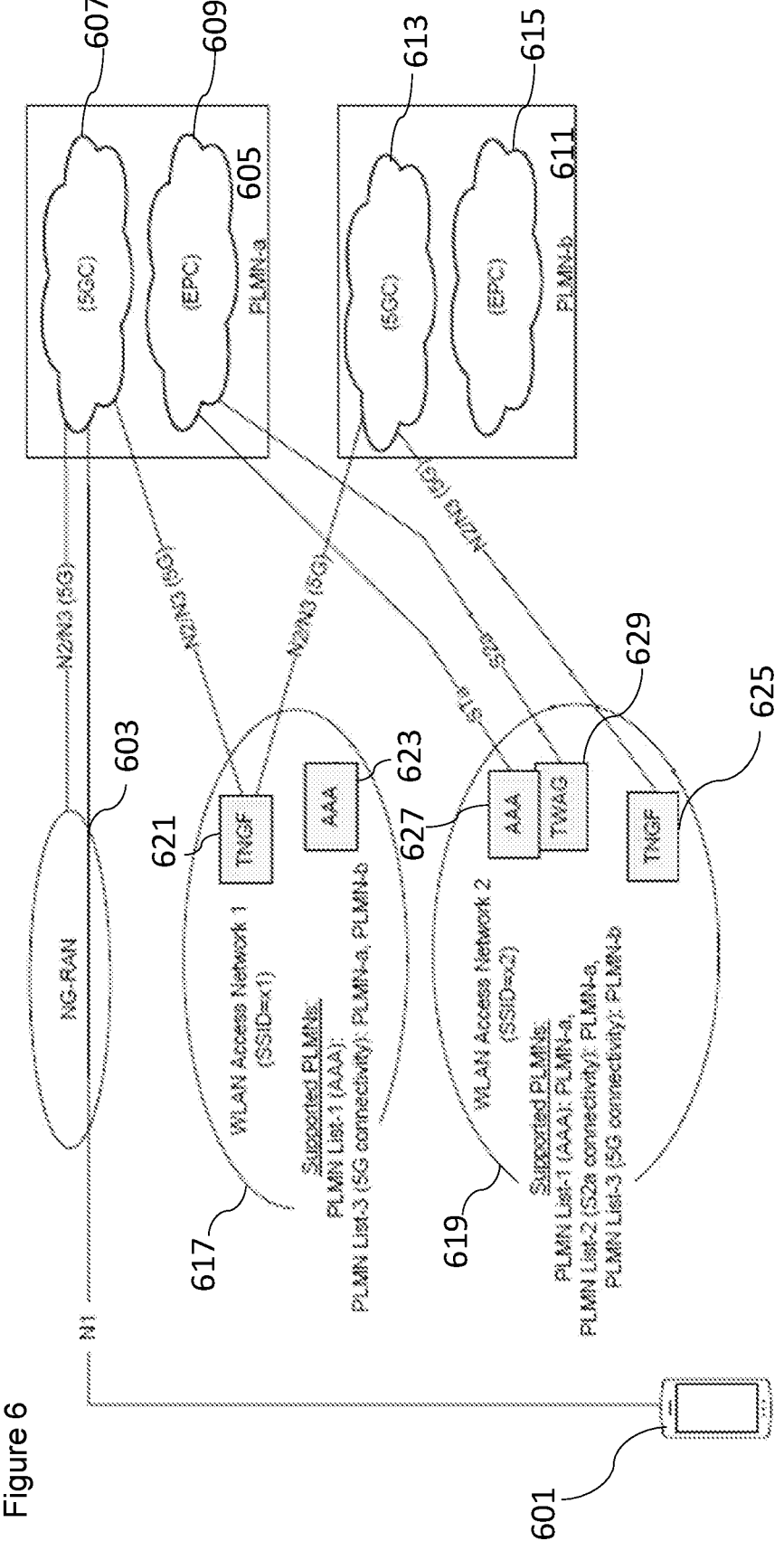
FIG. 6 shows a schematic representation of an example deployment for trusted non-3GPP access network selection.

FIG. 6 shows a schematic representation of an example deployment for trusted non-3GPP access network selection.

There is provided a UE 601. The UE has an N1 connection via an NG-RAN 603 to a first PLMN (PLMN-a) 605. The PLMN-a 605 has a first 5GC 607 and a first EPC 609. There is also a second PLMN (PLMN-b) 611, The PLMN-b 611 comprises a second 5GC 613 and a second EPC 615.

A first WLAN (WLAN 1) 617 and a second WLAN (WLAN 2) 619 are provided. WLAN1 617 has a TNGF 621 and an authentication, authorization and accounting entity (AAA) 623. The TNGF of WLAN1 617 is connected to the first 5GC 507 and the second 5GC 613

WLAN2 619 has a TNGF 625 that is connected to the second 5GC 613. WLAN2 619 also has an AAA 627 and a TWAG 629. The AAA 627 of WLAN2 619 is connected to the first EPC 609.

Therefore, in this example, the PLMN supports for both WLANs are as follows. For WLAN1 617, the PLMN list-1 (AAA) is empty. PLMN list-3 (5G connectivity) comprises PLMN-a 605 and PLMN-b 611. For WLAN2 619, the PLMN list-1 (AAA) comprises PLMN-a 605. PLMN list-1 (S2a connectivity) comprises PLMN-a 605. PLMN list-3 (5G connectivity) comprises PLMN-b.

When the UE 601 wants to discover the PLMN List(s) supported by a non-3GPP access network and the non-3GPP access network supports access network query protocol (ANQP), the UE may send an ANQP query to the non-3GPP access network requesting '3GPP cellular network' information. If the non-3GPP access network supports interworking with one or more PLMNs, the response received by the UE may include a '3GPP cellular network' information element containing one or more PLMN lists.

The UE 601 may determine if a non-3GPP access network supports 'trusted connectivity' to a specific PLMN by receiving the PLMN List-2 and the PLMN List-3 advertised by this access network. If this PLMN is not included in any of these lists, then the non-3GPP access network can only support connectivity to an evolved packet data gateway (ePDG) or N3IWF in the PLMN (i.e. 'untrusted connectivity'). It may be assumed that when the trusted non-3GPP access is a trusted WLAN access, the TNAP selects a TNGF based on the realm provided by the UE 601, and also based on the SSID selected by the UE 601.

The mobility of a UE between two TNAPs within the same TNGF is not currently supported in 3GPP without a disconnection to the source TNAP and then re-connecting to the target TNAP.

For example, when a UE moves between two nearby or overlapping TNAPS, for example, TNAP1 to TNAP2, then the connectivity will break. Therefore, UE services will be interrupted. The UE needs to reconnect and go through another authentication procedure to continue the service, even though TNAP1 and TNAP2 connect to the same 5GC. This deployment scenario may exist in, for example, enterprise networks or enterprise networks overlapping with public switched telephone network (PSTN) deployed Wi-Fi.

In other systems, it has been proposed to utilise extensible authentication protocol (EAP) re-authentication protocol (ERP) for mobility between TNAPs. The ERP may be used, as specified in 3GPP RFC 6696, in order to enable the UE to move from a source TNAP to a target TNAP within the area of the same TNGF. However, this solution is not supported by current 3GPP specifications Therefore, in many situations, for UEs (or other devices) and 3GPP 5GC, this proposal would not function.

One or more of the following examples aims to address one or more of the problems identified above.

In examples, a user equipment (UE) is connected to a source access point (e.g. source TNAP). The UE determines a change of connection from the source access point to a target access point. The UE receives, from the target access point, an indication that an associated gateway function is the same for the source access point and the target access point. The UE then generates an access point key based on the received indication from the target access point, and secures communications with the target access point using the generated access point key. In this way, when the UE moves and tries to connect to the target TNAP (which has the same TNGF as the source TNAP), the TNGF is able to authorize the request and generate new keys with the UE, without the need to perform a further primary authentication. This will be described in more detail below.

Figure 7:
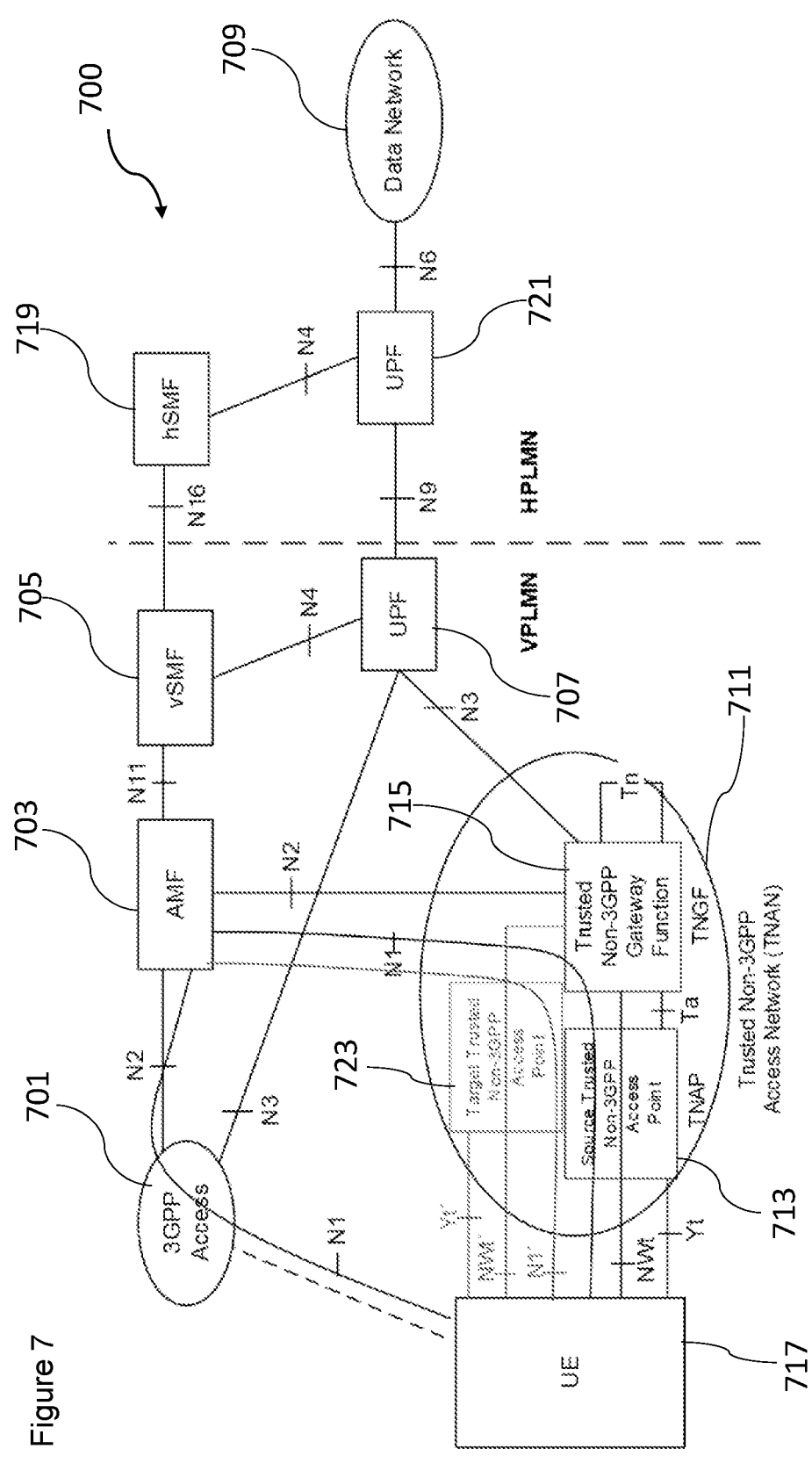
FIG. 7 shows a schematic representation of a non-roaming architecture for a 5G Core Network with mobility within trusted non-3GPP access.

FIG. 7 shows a schematic representation of a non-roaming architecture for a 5G Core Network with mobility within trusted non-3GPP access.

The system 700 comprises a 3GPP access node 701, an AMF 703, a visitor SMF (vSMF) 705, and a UPF 707. The UPF 707 is connected to home UPF 721. The home UPF 721 is connected to a data network 409. The home UPF 721 is also connected to a home SMF (hSMF) 719.

The system 700 also comprises a TNAN 711. The TNAN 711 comprises a TNAP 713 and a TNGF 715. The TNAN 711 is connected to a UE 717. The TNAN 711 is also connected to the AMF 703 and the UPF 707. As well as being connected to the TNAN 711, the UE 717 is connected to the 3GPP access node 701.

The TNAP 713 is a source TNAP as the UE 7171 is currently connected to the TNAP 713.

The 3GPP access node 701, the AMF 703, the vSMF 705, the UPF 707, and the TNAN 411 are comprised within a visitor PLMN. The home UPF 721, the hSMF 719 and the data network 709 are comprised within a home PLMN.

The system 700 further comprises a target TNAP 723. The target TNAP 723 is arranged between the UE 717 and the AMF 703, in a similar manner to the (source) TNAP 713.

In FIG. 7, the target TNAP 723 and the source TNAP 713 are connected to the same TNGF 715. In the figure, 'Yt'' is labelled as the interface between the UE 717 and the target TNAP 723. 'NWt'' is labelled as the interface between the UE 717 and the TNGF 715 connected via the target TNAP 723. 'N1'' is labelled as the interface between the UE 717 and the AMF 703 connected via the target TNAP 723.

Figure 8A:
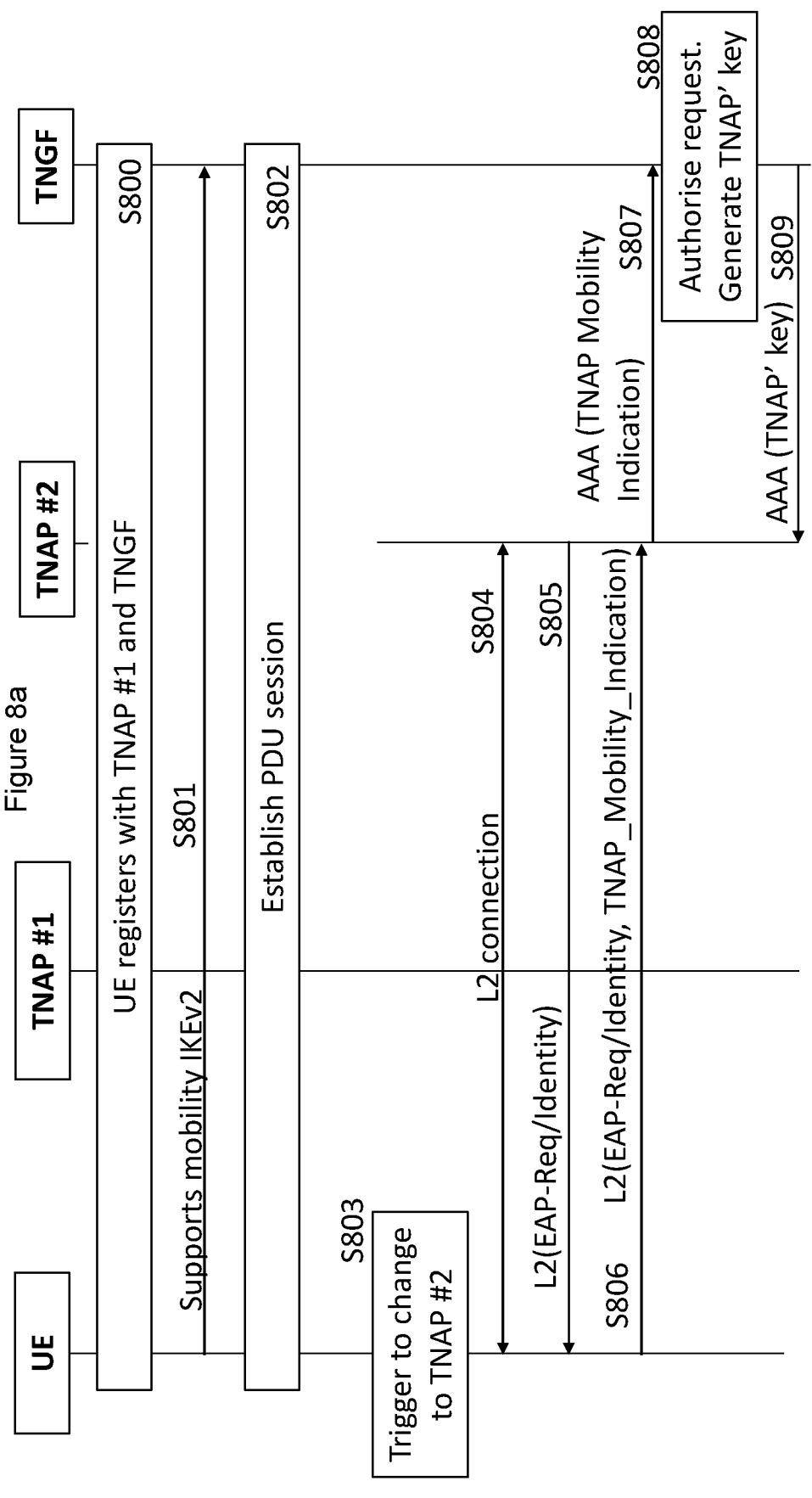
FIGS. 8a and 8b show an example signalling flow between a user equipment and network entities for a trusted non-3GPP access mobility procedure.
Figure 8B:
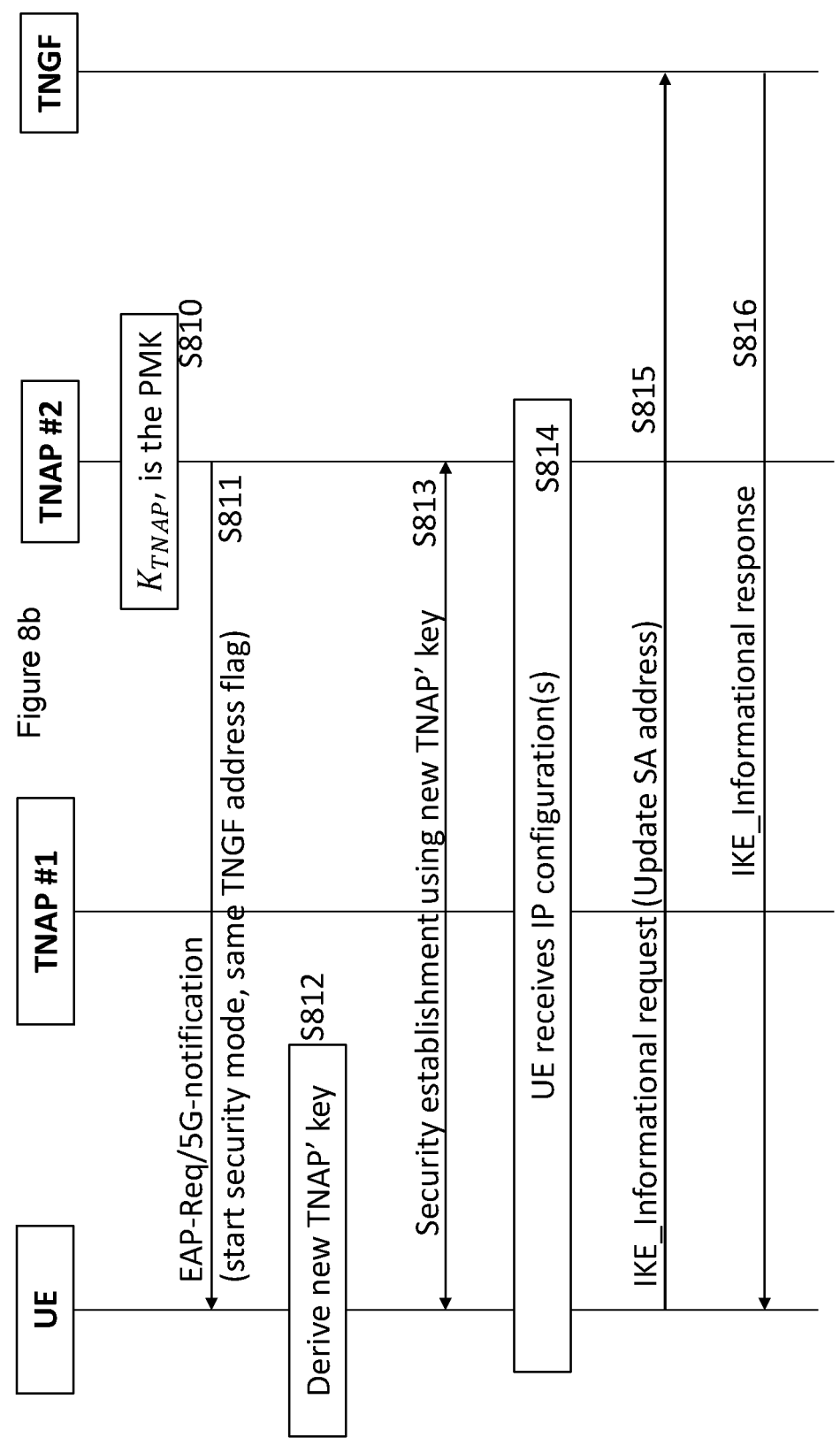

FIGS. 8a and 8b show an example signalling flow between a user equipment and network entities for a trusted non-3GPP access mobility procedure.

In FIG. 8a, at S800, a UE registers with a first TNAP (TNAP #1) and a TNGF. The first TNAP is associated with the TNGF. The first TNAP and the TNGF are part of a (same) TNAN.

The first TNAP may be referred to as a source TNAP. The second TNAP may be referred to as a target TNAP.

The steps for the UE to perform a registration with the first TNAP and the TNGF are known. For example, see steps 1 to 13a of FIG. 7A.2.1-1 in 3GPP TS 33.501.

At S801, the UE provides a message to the TNGF to indicate that the UE supports mobility between different TNAPs. In some examples, the UE provides an 'IKE AUTH' message to the TNGF with a "MOBIKE_SUPPORT_IND" flag. This flag conveys that UE supports mobility internet key exchange version 2 (IKEv2). This flag may then be stored in the TNGF and checked when/if a mobility is triggered. Any suitable name for the flag may be used in other examples.

At S802, the UE initiates a protocol data unit (PDU) session establishment with the first TNAP and the TNGF.

The TNGF may establish one or more IPSec child security associations (SAs) per PDU session.

The steps for the UE to initiate PDU session establishment with the first TNAP and the TNGF are known. For example, see steps 13c to 15b of FIG. 7A.2.1-1 in 3GPP TS 33.501.

At S803, the UE determines or decides that there should be a change from the first TNAP to a second TNAP (TNAP #1). This may also be referred to as moving from the source TNAP to a target TNAP. The UE may determine that the connection should move from the first TNAP to the second TNAP because the UE has moved location.

The second TNAP may be comprised within the same TNAN as the first TNAP and the TNGF.

This determination or decision, by the UE, triggers a procedure to change a connection to the second TNAP.

At S804, a connection is established between the UE and the second TNAP. The connection may be a layer 2 (L2) connection.

At S805, the second TNAP provides a message to the UE, the message requesting an identity of the UE. The message may be an L2 EAP-Request for identity.

At S806, the UE provides a response message to the second TNAP with identity information of the UE. The response message also comprises an indication of the intention for the UE to move from the first TNAP to the second TNAP.

In some examples, the UE responds to the second TNAP with an L2 EAP-Response with the UE identity and a 'TNAP Mobility Indication' flag.

At S807, the second TNAP forwards the indication of the intention for the UE to move from the first TNAP to the second TNAP to the TNGF. The second TNAP may forward the indication within an AAA message. In other examples, it may be provided in another suitable message type.

In examples when the UE provides the L2 EAP-Response with the UE identity and the 'TNAP Mobility Indication' flag. The second TNAP then forwards the EAP response with the TNAP Mobility Indication flag towards TNGF.

At S808, in response to receiving the indication (request for a move) from the UE, the TNGF will authorise the request. The TNGF may authorise the request using a stored context associated with the UE. The TNGF may use the mobility support indication received in S801, from the UE, to authorise the move from the first TNAP to the second TNAP. In examples when the TNGF determines that a UE does not have the mobility support, then the following steps (S809 to S816) may not take place. In this example, as follows, it is assumed that the UE does support mobility, as was indicated in S801.

The TNGF may also maintain a counter. The counter may be used to indicate a number of TNAP changes/moves that the UE has made. When the UE moves from a source TNAP to a target TNAP (e.g. the first TNAP to the second TNAP in this example of FIG. 8), the TNGF may use an incremented counter to derive the one or more key for the second TNAP. When the TNGF increments the counter, the UE is signalled to use the same count value, to derive the same set of keys. Alternatively, the UE is instructed to increment a counter maintained at the UE. This will be described in more detail below.

In some examples, the TNGF generates a random number. When the TNGF generates the random number, the TNGF signals the UE with the same random number. The TNGF derives/generates one or more access point keys. The access point keys may be TNAP keys (referred to as TNAP/TNAP' key herein).

In this example, the notation 'MAP key' means that the key is associated with the first TNAP, while the notation 'TNAP' key' means that the key is associated with the second TNAP.

The one or more TNAP' keys derived/generated by the TNGF are associated with the second TNAP. In some examples, the TNGF generates a single TNAP' key when there is a single TNAP. Due to mobility when the TNAP changes, new TNAP keys are to be generated because that new TNAP will have been assigned.

The TNGF may derive/generate the TNAP' key using a TNAP key (associated with the first TNAP). The TNGF has access to the TNAP key. This will be described in more detail below.

The TNGF may derive/generate the TNAP' key using a key provided to the TNGF by an AMF. This received key, from the AMF, may be referred to as $K_{TNGF}$.

The TNAP' key may be derived or generated by the TNGF in different ways, as will be discussed in detail below, alongside FIG. 9. For example, the TNGF may use of the counter value or the random number to derive/generate the TNAP' key.

At S809, the TNGF provides the TNAP' key to the second TNAP. The TNAP' key may be provided within an AAA message. In other examples, they may be provided in another suitable message type.

In FIG. 8b, at S810, once received at the second TNAP, the second TNAP may consider that the received TNAP' key is considered as a pairwise master key (PMK). The PMK may be used to encrypt the session between the UE and the second TNAP.

At S811, the second TNAP provides a notification message to the UE that the request for the move from the first TNAP to the second TNAP is authorised. In some examples, the notification message is an EAP-notification. In other examples, other suitable message types are used.

The notification message comprises an indication that the first and second TNAPs are associated/connected to the (same) TNGF. The notification message may comprise a (same) TNGF address flag. The (same) TNGF address flag indicates that the TNGF confirms to the UE that the second TNAP is connected to the same TNGF as the first TNAP (i.e. only the TNAP is being changed). The notification message may comprise an indication for the UE to start a security mode. The start security mode command is a message to active security at the UE.

The UE may maintain a counter. The counter at the UE may be similar to the counter of the TNGF. The notification message received at the UE may instruct the UE to increment the counter, trigger the UE to increment the counter, or comprise an incremented counter. Once the UE has received the notification message, the value of the counter maintained at the TNGF and the UE is the same.

In this example, if this move/handover procedure is considered the first, then the counter at the TNGF will have a value of 1. The counter at the UE will also have a value of 1. If there were to be a further move/handover procedure then the counters would increment to 2, and so on.

In some examples, the UE may receive a signalling of a random number that has been generated by the TNGF. The random number may be received in the notification message. In other examples, the random number is received in separate signalling. When the UE receives the random number, the UE may use the random number to derive/generate a TNAP' key, as will be described in detail below.

At S812, the UE derives/generates a further TNAP key. The UE derives/generates the further TNAP key using the received information indicating that the TNGF is the same for the first and second TNAPs. The further TNAP key may be derived or generated by the UE in different ways, as will be discussed in detail below, alongside FIG. 9.

For example, the UE may derive/generate the further TNAP key from a TNAP key associated with the first TNAP. The TNAP key associated with the first TNAP may be currently in use by the UE, in order to secure communications with the first TNAP before the move/handover to the second TNAP.

For example, the UE may use the counter maintained at the UE to derive/generate the further key. The TNGF and the UE may generate the respective keys in the same manner.

The TNAP' key generated by the TNGF, and the further key generated by the UE are the same.

At S813, the UE and the second TNAP establish a (secure) connection with each other. The UE performs a security establishment procedure with the second TNAP using the further TNAP key. The security establishment procedure may also utilise the PMK.

In some examples, a 4-way handshake is executed between the UE and the second TNAP which establishes a security context between the second TNAP and the UE. The 4-way handshake may be used to protect unicast and multicast traffic over the air.

At S814, the UE receives one or more IP configurations from the second TNAP. In some examples, the UE receives one or more IP addresses associated with the second TNAP.

At S815, the UE provides an update message to the TNGF comprising an indication to update a security association (SA) address of the UE.

The UE may request an update to the SA address using an IKE informational request "UPDATE SA ADDRESS" to the TNGF.

At S816, when the TNGF accepts the SA address, the TNGF provides a response message to the UE indicating a successful update. The response may be an IKE informational response.

In examples, to support mobility across access points (e.g. across the TNAPs), the UE indicates (S801), first, to the TNGF that the UE supports mobility, for example 'MOBIKE'. The 'MOBIKE' indicating that the UE has the capability to use/be associated with multiple IP address. For example, the UE has two IP addresses as the UE moves from the first TNAP to the second TNAP.

When the UE provides the indication to the TNGF, the UE may provide two (or more) IP addresses that the UE has support for. For example, a first IP address that is associated with the first TNAP, and a second IP address that is associated with the second TNAP.

Following this, when the UE requests a change (S806) of the connection for the first TNAP to the second TNAP, the UE indicates to the TNGF that a previous IP address of the UE was, for example, IPaddress1, and a new IP address of the UE is, for example IPaddress2. This may be to allow the TNGF to recognise the UE as the same UE for both IP addresses (i.e. the UE is associated with the previous and the new IP address). In this way, when the TNGF receives the request to change and the new IP address, as the UE has previously indicated the UE's support for the new IP address, the TNGF determines that it is the same UE. The TNGF may use the new IP address for future communications with the UE.

The TNGF may provide, to the user equipment, an acknowledgment that the user equipment is (successfully) associated with the first IP address and the second IP address at the TNGF.

In this way, the TNGF is able recognise the UE, when the UE is communicating with the TNGF via the second TNAP, once the procedure has completed (as the UE is associated with both IP addresses).

It should be understood that in some examples, one or more of the steps described above may not be performed, or may be performed in different orders.

Figure 9:
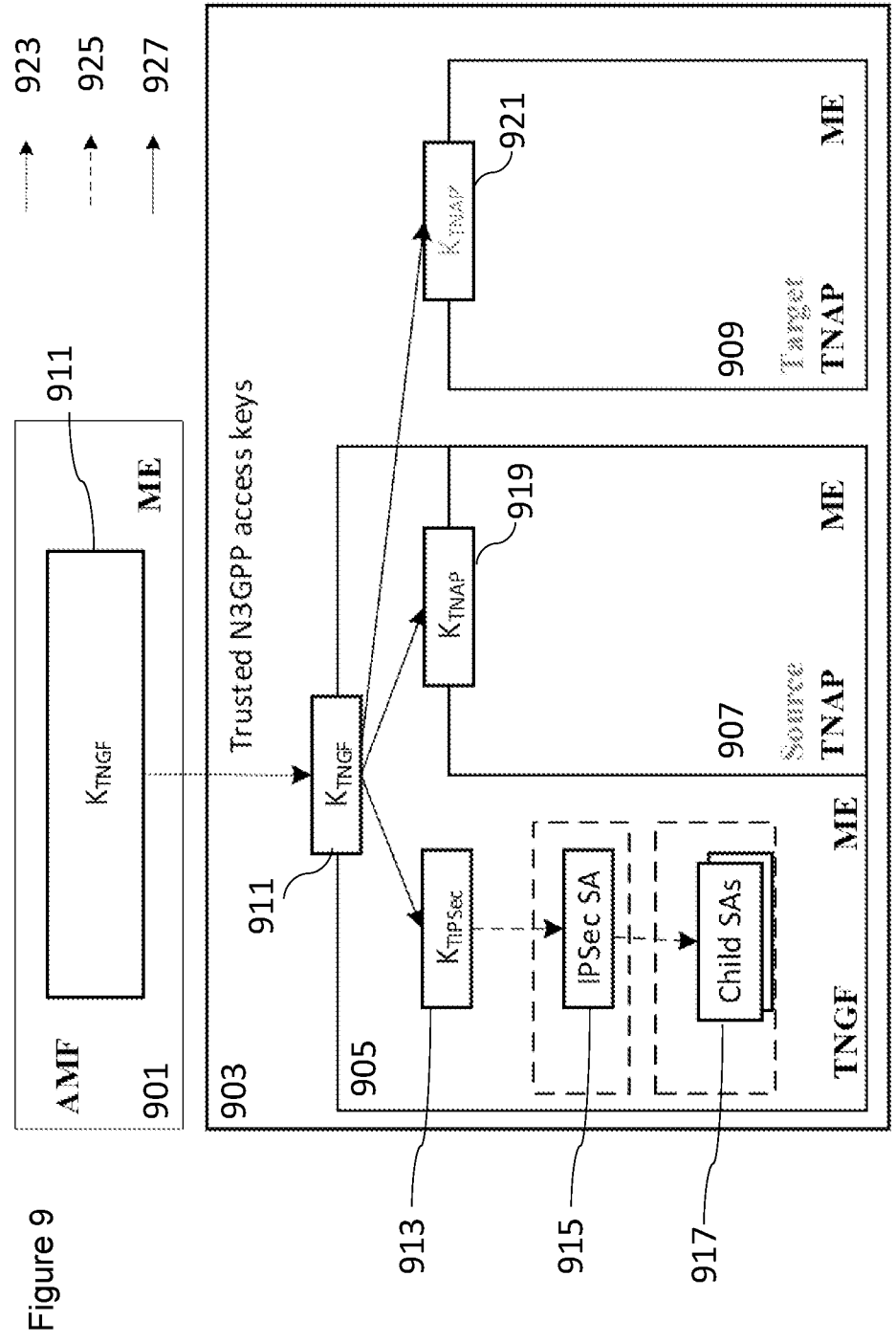
FIG. 9 shows a schematic representation of key generation within a trusted non-3GPP access network.

FIG. 9 shows a schematic representation of key generation within a trusted non-3GPP access network.

There is provided an AMF 901 and a TNAN 903. The TNAN 903 comprises a TNGF 905, a first (source) TNAP 907 and a second (target) TNAP 909. The first TNAP 907 is shown within the TNGF 905, in FIG. 9, indicating that the first TNAP 907 is currently associated with/connected to the TNGF 905.

The AMF 901 has a TNGF key ($K_{TNGF}$) 911. The AMF 901 provides the $K_{TNGF}$ 911 to the TNGF 905. The TNGF 905 uses the $K_{TNGF}$ 911 to generate a trusted IPSec key ($K_{TIPSec}$) 913. The $K_{TIPSec}$ 913 is used to generate an IPSec SA 915. The IPSec SA 915 is used to generate one or more child SAs 917.

The TNGF 905 uses the $K_{TNGF}$ 911 to generate a first TNAP key ($K_{TNAP}$) 919. The TNGF 905 uses the $K_{TNGF}$ 911 to generate a second TNAP key ($K_{TNAP'}$) 921.

In FIG. 9, the dotted lines 923 are used to indicate that no operations are being performed. In this case, a transfer is taking place. The dashed lines 925 are used to indicate a use to setup IPSec SAs. The solid lines 927 are used to indicate a key derivation.

The TNGF may derive the TNAP keys, as previously discussed, using one or more of a plurality of different methods. The UE may also derive TNAP keys, as previously discussed, using one or more of a plurality of different methods. The methods performed by the TNGF and UE may be similar, or the same in some examples. Examples of these methods are discussed in detail below.

In an example, a KTNAP to KTNAP' derivation is performed, in mobility, via a count method. The count method may be performed by one or both of the TNGF and the UE.

KTNAP is a key used for communications with the first TNAP 907. KTNAP' is a key used for communications with the second TNAP 909, The following example assumes that a UE is connected to a first TNAP (for example, the first TNAP of FIGS. 8a and 8b) and is moving to a second TNAP (for example, the second TNAP of FIGS. 8 and 8b).

In the count method, a derivation of KTNAP' from KTNAP during mobility uses at least one of the following input parameters: FC='0xWX', P1='COUNT', L1=length of COUNT (e.g. 0x00 0x04).

FC is fixed, whereas P1 and L1 are variable. As discussed in FIGS. 8a and 8b the TNGF and/or UE may maintain a counter. The value of the counter is COUNT in this method. In this key generation, the COUNT (of a counter) is used to increment the variable part in the input parameters of key generation logic.

The input key, "KEY", is KTNAP. It is assumed that the entity performing the derivation (i.e. TNGF and/or UE) knows the KTNAP when performing this derivation.

In an example, a TNGF and/or UE derives a KTNAP' key using KTNAP key and the input parameters FC, P1, and L1. P1 is the value of the counter (e.g. as described in FIGS. 8a and 8b), and L1 is the length of the counter value. In the example of FIGS. 8a and 8b, the value of the counter is 1. When the TNGF and the UE derive the KTNAP' key, both the TNGF and the UE will derive the same key. The keys derived by the TNGF and the UE will be the same as the input key and the input parameters used are the same.

KTNAP' may be derived in mobility (e.g. a TNAP handover), and 'COUNT' is the downlink 'NAS COUNT' of the non-3GPP access.

In another example, a KTNAP to KTNAP' derivation is performed, in mobility, via a random (RAND) method. In this RAND method, a derivation of KTNAP' from KTNAP during mobility use at least one of the following input parameters: FC='0xWX', P1='RAND', L1=length of RAND (e.g. 0x00 0x04).

The RAND method is similar to the COUNT method, except that a random number is used, rather than a counter value.

In the RAND method, a random number is generated. The random number may be generated by a TNGF. For example, at S808 of FIG. 8a above. The generated number will then be provided to the UE. The TNGF and UE have access to the same number so that, during key derivation, the TNGF and the UE derive the same key.

In an example, a TNGF and/or UE derives a KTNAP' key using KTNAP key and the input parameters FC, P1, and L1. P1 is the value of the RAND number, and L1 is the length of the RAND number. When the TNGF and the UE derive the KTNAP' key, both the TNGF and the UE will derive the same key. In this way, the network (e.g. TNGF) and the UE generate the keys independently, but the keys are the same.

The input key, 'KEY', is KTNAP. KTNAP' may be derived in mobility (e.g. a TNAP handover), wherein the 'RAND' is generated and shared with the UE.

One or more of the examples above have the advantage that a user equipment is able to move to/handover to a target TNAP (from the source TNAP that the UE is connected to) without performing a (full) authentication process for the target TNAP. This means that the UE can move connection from the source to the target TNAP without an interruption in the network connection. The UE can continue to communicate with the network via the TNGF during the move/handover. As a (full) authentication process for the target TNAP is not needed (in addition to the authentication procedure needed to initially connect to the source TNAP) this i) saves network resources, and ii) reduces the latency needed for authentication, when moving from the source to the target TNAP. Furthermore, the procedure allows a TNGF to authenticate a request from a UE, and to generate the necessary keys, without the need to use the EAP re-authentication protocol (ERP).

FIG. 10 shows an example method flow performed by an apparatus. The apparatus may be comprised within a user equipment.

In S1001, the method comprises determining a change of connection at a user equipment from a source access point to a target access point.

In S1001, the method comprises receiving, from the target access point, an indication that an associated gateway function is the same for the source access point and the target access point;

In S1001, the method comprises generating an access point key based on the received indication from the target access point.

In S1001, the method comprises securing communications with the target access point using the generated access point key.

Figure 11:
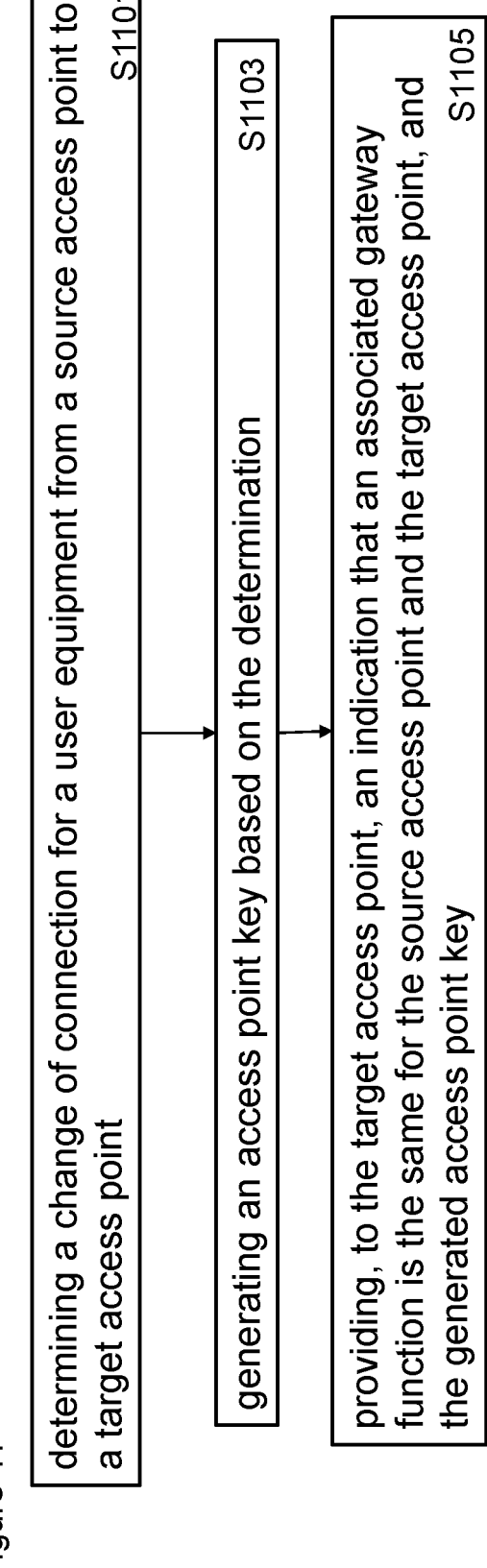
FIG. 11 shows an example method flow diagram performed by a gateway function.

FIG. 11 shows an example method flow performed by an apparatus. The apparatus may be comprised within a network function. In an example, the network function is a gateway function.

In S1101, the method comprises determining a change of connection for a user equipment from a source access point to a target access point.

In S1101, the method comprises generating an access point key based on the determination.

In S1101, the method comprises providing, to the target access point, an indication that an associated gateway function is the same for the source access point and the target access point, and the generated access point key.

FIG. 12 shows an example method flow performed by an apparatus. The apparatus may be comprised within a network function. In an example, the network function is a access point.

In S1201, the method comprises determining a change of connection at a user equipment from a source access point to a target access point.

In S1203, the method comprises receiving, from a gateway function, an indication that the gateway function is the same for the source access point and the target access point, and an access point key associated with the target access point.

In S1205, the method comprises providing, to the user equipment, an indication that the gateway function is the same for the source access point and the target access point.

In S1207, the method comprises securing communications with the user equipment using the received access point key associated with the target access point.

FIG. 13 shows a schematic representation of non-volatile memory media 1300a (e.g. computer disc (CD) or digital versatile disc (DVD)) and 1300b (e.g. universal serial bus (USB) memory stick) storing instructions and/or parameters 1302 which when executed by a processor allow the processor to perform one or more of the steps of the methods of FIG. 10, FIG. 11 or FIG. 12.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The term "non-transitory", as used herein, is a limitation of the medium itself (i.e. tangible, not a signal) as opposed to a limitation on data storage persistency (e.g. RAM vs ROM).

As used herein, "at least one of the following: <a list of two or more elements>" and "at least one of: <a list of two or more elements>" and similar wording, where the list of two or more elements are joined by "and", or "or", mean at least any one of the elements, or at least any two or more of the elements, or at least all of the elements.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

We claim:

1. An apparatus comprising: at least one processor; and at least one memory storing instructions that, when executed by the at least one processor, cause the apparatus at least to perform:

determining a change of connection at a user equipment from a source access point to a target access point;

receiving, from the target access point, an indication that an associated gateway function is the same for the source access point and the target access point;

generating an access point key based on the received indication from the target access point; and securing communications with the target access point using the generated access point key.

2. The apparatus according to claim 1, wherein the determining comprises: providing, to a gateway function, a request to change the connection of the user equipment from the source access point to the target access point.

3. The apparatus according to claim 1, wherein the generating comprises:

generating the access point key based on the received indication from the target access point, and a further access point key associated with the source access point.

4. The apparatus according to claim 3, wherein the at least one processor; and the at least one memory storing instructions that, when executed by the at least one processor, further cause the apparatus at least to perform:

receiving a random number value generated by the gateway function, and wherein the generating comprises:

generating the access point key using the received random number value as an input parameter.

5. The apparatus according to claim 3, wherein the at least one processor; and the at least one memory storing instructions that, when executed by the at least one processor, further cause the apparatus at least to perform:

maintaining a counter;

in response to receiving the indication, incrementing the counter, and wherein the generating comprises:

generating the access point key using a current value of the counter as an input parameter.

6. The apparatus according to claim 1, wherein the at least one processor; and the at least one memory storing instructions that, when executed by the at least one processor, further cause the apparatus at least to perform:

providing, to the gateway function, a further indication that the user equipment supports mobility between the source access point and the target access point.

7. The apparatus according to claim 1, wherein the at least one processor; and the at least one memory storing instructions that, when executed by the at least one processor, further cause the apparatus at least to perform: triggering a change of connection from a source access point to a target access point at the user equipment.

8. The apparatus according to claim 1, wherein the at least one processor; and the at least one memory storing instructions that, when executed by the at least one processor, further cause the apparatus at least to perform: receiving, from the target access point, an identity request for an identity of the user equipment.

9. The apparatus according to claim 1, wherein the request comprises: an identity of the user equipment, and a flag indicating a request to change connection from the source access point to the target access point.

10. The apparatus according to claim 1, wherein the securing communications with the target access point comprises: performing a four-way handshake with the target access point using the generated access point key, in order to establish a connection with the target access point.

11. The apparatus according to claim 1, wherein the apparatus comprises: means for providing, to the gateway function, a message with a request for the gateway function to update a security association address of the user equipment.

12. The apparatus according to claim 1, wherein the at least one processor; and the at least one memory storing instructions that, when executed by the at least one processor, further cause the apparatus at least to perform: receiving, from the gateway function, a response message indicating that the security association address of the user equipment has been successfully updated.

13. The apparatus according to claim 1, wherein the source and target access points are trusted non-3GPP access points.

14. The apparatus according to claim 1, wherein the apparatus comprises the user equipment, is the user equipment, or is comprised in the user equipment.

15. An apparatus comprising: at least one processor; and at least one memory storing instructions that, when executed by the at least one processor, cause the apparatus at least to perform:

determining a change of connection for a user equipment from a source access point to a target access point;

generating an access point key based on the determination; and providing, to the target access point, an indication that an associated gateway function is the same for the source access point and the target access point, and the generated access point key.

16. The apparatus according to claim 15, wherein the determining comprises: receiving, from the user equipment, a request to change the connection of the user equipment from the source access point to the target access point.

17. The apparatus according to claim 15, wherein the generating comprises:

generating the access point key using a further access point key associated with the source access point.

18. The apparatus according to claim 17, wherein at least one processor; and at least one memory storing instructions that, when executed by the at least one processor, cause the apparatus at least to perform:

generating a random number value, and wherein the generating comprises:

generating the access point key using the random number value as an input parameter.

19. An apparatus comprising: at least one processor; and at least one memory storing instructions that, when executed by the at least one processor, cause the apparatus at least to perform:

determining a change of connection at a user equipment from a source access point to a target access point;

receiving, from a gateway function, an indication that the gateway function is the same for the source access point and the target access point, and an access point key associated with the target access point;

providing, to the user equipment, an indication that the gateway function is the same for the source access point and the target access point; and securing communications with the user equipment using the received access point key associated with the target access point.

20. The apparatus according to claim 19, wherein the determining comprises: receiving, from the user equipment, a request to change the connection of the user equipment from the source access point to the target access point.

* * * * *